US012763320B2

(12) United States Patent
Kim et al.

(10) Patent No.: US 12,763,320 B2
(45) Date of Patent: Oct. 13, 2026

(54) COMPOSITE POSITIVE ACTIVE MATERIAL FOR LITHIUM SECONDARY BATTERY, METHOD OF PREPARING COMPOSITE POSITIVE ACTIVE MATERIAL, AND LITHIUM SECONDARY BATTERY INCLUDING COMPOSITE POSITIVE ACTIVE MATERIAL

(71) Applicant: Samsung SDI Co., Ltd., Yongin-si (KR)

(72) Inventors: Youngki Kim, Yongin-si (KR); Yongmok Cho, Yongin-si (KR); Sungho Choo, Yongin-si (KR); Sangmi Kim, Yongin-si (KR); Minjae Choi, Yongin-si (KR); Jaeyoung Jeong, Yongin-si (KR); Hyunjei Chung, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 816 days.

(21) Appl. No.: 18/053,125

(22) Filed: Nov. 7, 2022

(65) Prior Publication Data

US 2023/0141441 A1 May 11, 2023

(30) Foreign Application Priority Data

Nov. 8, 2021 (KR) ........................ 10-2021-0152435

(51) Int. Cl.
*H01M 4/00* (2006.01)
*H01M 4/36* (2006.01)
(Continued)

(52) U.S. Cl.
CPC ........... *H01M 4/366* (2013.01); *H01M 4/525* (2013.01); *H01M 2004/028* (2013.01)

(58) Field of Classification Search
CPC ....... C01G 51/50; C01G 53/50; H01M 4/366; H01M 4/485; H01M 4/525; H01M 2004/028; C01P 2004/61; C01P 2006/40
See application file for complete search history.

(56) References Cited

U.S. PATENT DOCUMENTS

2014/0045067 A1* 2/2014 Cho .................. C01G 45/1235 429/231.95
2015/0024280 A1* 1/2015 Uchiyama ........... H01M 10/052 429/231.5
(Continued)

FOREIGN PATENT DOCUMENTS

KR 10-2009-0080939 A 7/2009
KR 10-2013-0118196 A 10/2013
(Continued)

OTHER PUBLICATIONS

Korean Office Action for KR Application No. 10-2021-0152435, dated Jan. 22, 2025, 16 pp.

*Primary Examiner* — Nicholas P D'Aniello
(74) *Attorney, Agent, or Firm* — Womble Bond Dickinson (US) LLP

(57) ABSTRACT

Provided are a composite positive active material for a lithium secondary battery, a method of preparing the composite positive active material, and a lithium secondary battery containing a positive electrode including the composite positive active material. The composite positive active material may include a lithium cobalt-based oxide, wherein a particle coating portion may be in an island form on a surface of the lithium cobalt-based oxide, the particle coating portion including a first coating layer containing lithium titanium-based oxide, a lithium-deficient cobalt oxide phase having a molar ratio of lithium to cobalt of 0.9 or less may be included in an inner portion of the lithium cobalt-based oxide corresponding to the particle coating
(Continued)

portion, and the composite positive active material may include a first lithium zirconium-based oxide spaced apart from a surface of the lithium cobalt-based oxide.

24 Claims, 34 Drawing Sheets

(51) Int. Cl.

| | |
|---|---|
| ***H01M 4/525*** | (2010.01) |
| *H01M 4/02* | (2006.01) |

(56) References Cited

U.S. PATENT DOCUMENTS

| | | | | |
|---|---|---|---|---|
| 2015/0340689 | A1* | 11/2015 | Song | H01M 4/5825 427/126.3 |
| 2016/0020456 | A1 | 1/2016 | Song et al. | |
| 2016/0079597 | A1 | 3/2016 | Fujiki et al. | |
| 2017/0222211 | A1 | 8/2017 | Ryu et al. | |
| 2018/0248179 | A1* | 8/2018 | Wang | C01G 53/50 |
| 2018/0316007 | A1 | 11/2018 | Jo et al. | |
| 2020/0343537 | A1 | 10/2020 | Jo et al. | |
| 2022/0367860 | A1 | 11/2022 | Cho et al. | |
| 2022/0388865 | A1 | 12/2022 | Kim et al. | |
| 2023/0144644 | A1 | 5/2023 | Kim et al. | |
| 2023/0146800 | A1 | 5/2023 | Kim et al. | |
| 2023/0147051 | A1 | 5/2023 | Kim et al. | |

FOREIGN PATENT DOCUMENTS

| | | | |
|---|---|---|---|
| KR | 2016-0032664 | A | 3/2016 |
| KR | 2016-0040116 | A | 4/2016 |
| KR | 10-2017-0142428 | A | 12/2017 |
| KR | 10-2019-0054977 | A | 5/2019 |
| KR | 2021-0064155 | A | 6/2021 |

* cited by examiner

COMPOSITE POSITIVE ACTIVE MATERIAL FOR LITHIUM SECONDARY BATTERY, METHOD OF PREPARING COMPOSITE POSITIVE ACTIVE MATERIAL, AND LITHIUM SECONDARY BATTERY INCLUDING COMPOSITE POSITIVE ACTIVE MATERIAL

CROSS-REFERENCE TO RELATED APPLICATION

This application claims priority to and the benefit of Korean Patent Application No. 10-2021-0152435, filed on Nov. 8, 2021, in the Korean Intellectual Property Office, the entire content of which is hereby incorporated by reference.

BACKGROUND

1. Field

One or more embodiments of the present disclosure relate to a composite positive active material for a lithium secondary battery, a method of preparing the composite positive active material, and a lithium secondary battery containing a positive electrode including the composite positive active material.

2. Description of the Related Art

With the recent development of the advanced electronics industry, miniaturization and weight reduction of electronic equipment are possible, and the use of portable electronic devices is increasing. As a power source for such portable electronic devices, a lithium secondary battery that has high energy density and may be used for a long time is widely used.

Lithium cobalt oxide ($LiCoO_2$) is widely used as a positive active material for high-density lithium secondary batteries. However, when lithium cobalt oxide is used as a positive active material, as the positive active material comes into contact with an electrolyte in a battery environment, an interfacial structure may be destroyed due to corrosion by HF, especially at high temperatures, resulting in cobalt (Co) elution and capacity reduction.

In a high voltage environment, lithium cobalt oxide is doped with aluminum to prevent structural collapse of the positive active material having a layered structure. As such, when aluminum is doped, high voltage characteristics do not reach a satisfactory level, and thus, improvement is required in this regard.

SUMMARY

One or more embodiments of the present disclosure include a novel composite positive active material for a lithium secondary battery having improved stability and a method of preparing the novel composite positive active material.

One or more embodiments include a lithium secondary battery, having improved stability at a high temperature, containing a positive electrode including the composite positive active material for a lithium secondary battery.

Additional aspects of embodiments will be set forth in part in the description which follows and, in part, will be apparent from the description, or may be learned by practice of the presented embodiments of the disclosure.

According to one or more embodiments, a composite positive active material for a lithium secondary battery may include a lithium cobalt-based oxide, wherein:

a particle coating portion may be in an island form on a surface of the lithium cobalt-based oxide, the particle coating portion including a first coating layer containing a lithium titanium-based oxide, a lithium-deficient cobalt oxide phase having a molar ratio of lithium to cobalt of 0.9 or less may be included in an inner portion of the lithium cobalt-based oxide corresponding to the particle coating portion, and the composite positive active material may include a first lithium zirconium-based oxide spaced apart from a surface of the lithium cobalt-based oxide.

According to one or more embodiments, a method of preparing the composite positive active material for a lithium secondary battery may include mixing a lithium cobalt-based oxide, a titanium precursor, and cobalt hydroxide together to obtain a first precursor mixture and heat-treating the first precursor mixture, and mixing the product of primary heat treatment together with a zirconium precursor to obtain a second precursor mixture and heat-treating the second precursor mixture.

A content of the zirconium precursor may be in a range of about 0.6 parts to about 1.4 parts by weight, based on 100 parts by weight of the lithium cobalt-based oxide. A content of the cobalt hydroxide may be in a range of about 3.5 parts to about 7 parts by weight, based on 100 parts by weight of the lithium cobalt-based oxide.

The heat-treating of the first precursor mixture may be performed at a temperature in a range of about 850° C. to about 980° C., and the heat-treating of the second precursor mixture may be performed at a temperature in a range of about 950° C. to about 1,000° C.

According to one or more embodiments, a lithium secondary battery may contain the positive active material for a lithium secondary battery.

BRIEF DESCRIPTION OF THE DRAWINGS

The above and other aspects and features of certain embodiments of the disclosure will be more apparent from the following description taken in conjunction with the accompanying drawings, in which.

DETAILED DESCRIPTION

Figure 1A:
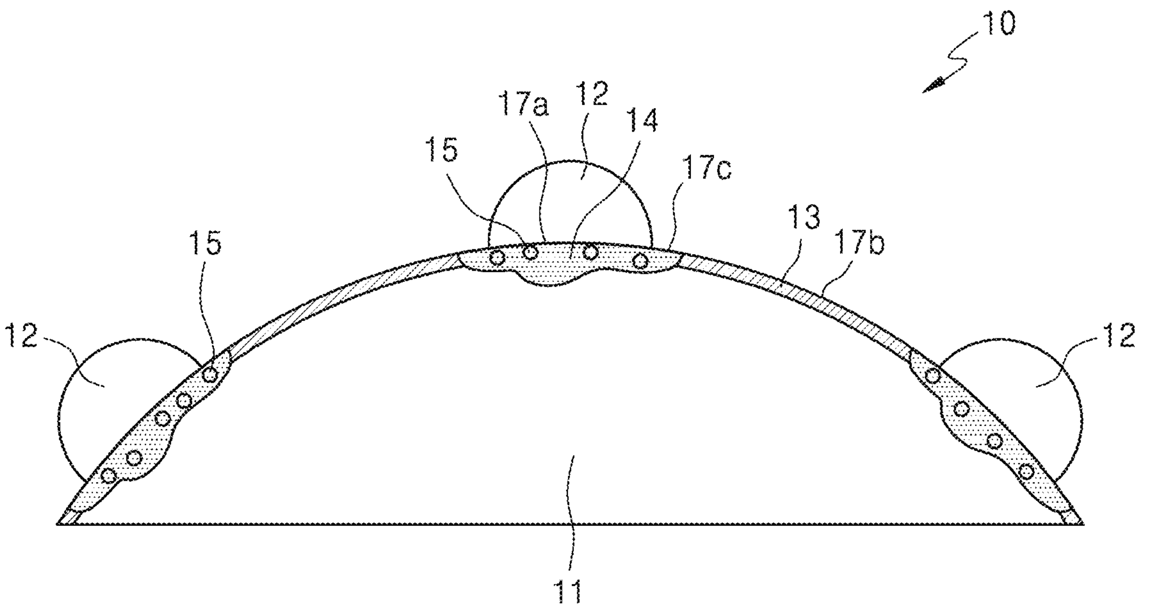
FIG. 1A is a schematic view illustrating a portion of a structure of a composite positive active material according to an embodiment.

Reference will now be made in more detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of embodiments of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, according to one or more embodiments, a composite positive active material, a method of preparing the composite positive active material, and a lithium secondary battery containing a positive electrode including the composite positive active material will be described in more detail.

A composite positive active material may include a lithium cobalt-based oxide, wherein a particle coating portion may be in an island form on a surface of the lithium cobalt-based oxide, the particle coating portion including a first coating layer containing a lithium titanium-based oxide. A lithium-deficient cobalt oxide phase having a molar ratio of lithium to cobalt of 0.9 or less may be included in an inner portion of the lithium cobalt-based oxide corresponding to the particle coating portion, and the composite positive active material may include a first lithium zirconium-based oxide spaced apart from a surface of the lithium cobalt-based oxide.

In the inner portion of the lithium cobalt-based oxide corresponding to the particle coating portion, the term "corresponding to the particle coating portion" may mean that the inner portion may be at the periphery of the particle coating portion, and the inner portion may be in contact (e.g., physical contact) with or spaced apart from the particle coating portion.

In the lithium cobalt-based oxide, the inner portion in contact (e.g., physical contact) with the particle coating portion may be denoted as a "first inner portion". The first lithium zirconium-based oxide may be included in a particle state at a position spaced apart from the inner portion corresponding to the particle coating portion.

A surface coating portion may be on an inner portion of another surface of the lithium cobalt-based oxide, and the surface coating portion may contain a third coating layer having a spinel crystalline structure. The inner portion of the other surface of the lithium cobalt-based oxide may represent a remaining portion of the lithium cobalt-based oxide excluding the first inner portion of the lithium cobalt-based oxide, and is denoted as a "second inner portion." The other surface of the lithium cobalt-based oxide represents the remaining surface (e.g., a second surface) other than the surface (e.g., a first surface) on which the particle coating portion is formed in the lithium cobalt-based oxide.

Lithium cobalt oxide ($LiCoO_2$) is a high-capacity positive active material and may have an O3-type layered-structure, for example, in which lithium, cobalt, and oxygen are ordered in a O—Li—O—Co—O—Li—O—Co—O arrangement along the [111]crystal plane of a rock salt structure. When a lithium secondary battery having a positive electrode including such lithium cobalt oxide is charged, lithium ions in a crystal lattice of lithium cobalt oxide are deintercalated out of the lattice.

When the charging voltage of the lithium secondary battery increases, the amount of lithium ions deintercalated in the crystal lattice of lithium cobalt oxide increases, such that at least a part of the O3-type layered-structure may be phase-transitioned to an O1-type layered-structure (O1 phase) in which Li is not present in the crystal lattice. Accordingly, in the range where the charging voltage is 4.52 V or greater (based on the full cell), phase transformation to the H1-3-type layered-structure (H1-3) in which both the O3-type layered-structure and the O1-type layered-structure exist in the crystal lattice of lithium cobalt oxide may occur. As such, the phase transition from the O3-type layered-structure to the H1-3-type layered-structure and the O1-type layered-structure may be at least partially irreversible. In the H1-3 type layered-structure and the O1 type layered-structure, lithium ions capable of intercalation/deintercalation are reduced (e.g., the H1-3 type layered-structure and the O1 type layered-structure are capable of intercalating/deintercalating relatively fewer lithium ions than the O3-type layered-structure). When such a phase transition occurs, the storage and lifespan characteristics of the lithium secondary battery are inevitably deteriorated (e.g., reduced). Also, when lithium cobalt oxide comes into contact (e.g., physical contact) with electrolyte, the interfacial structure is destroyed due to corrosion of HF, especially at high temperatures, which causes Co dissolution and capacity reduction, and the structure collapse of a positive active material having a layered structure in a high voltage environment may occur.

To address the above problems, lithium cobalt oxide doped with aluminum and magnesium as a positive active material may be used. However, the lithium secondary battery employing a positive electrode using such a positive active material may not reach a suitable or satisfactory level of high voltage characteristics, and thus, improvement is required or desired.

To address the above-mentioned issues, the composite positive active material according to one or more embodiments may be used. A lithium cobalt-based oxide having a set or predetermined content of aluminum and magnesium may be reacted with titanium (Ti), zirconium (Zr), and cobalt (Co) precursors, and thus, magnesium in the lithium cobalt-based oxide may migrate to a surface, thereby forming a structure in which a particle coating portion having a first coating layer containing a lithium titanium-based oxide on a surface of the lithium cobalt-based oxide in an island form through a Mg—Ti Kirkendall effect according to embodiments of the present disclosure.

The lithium cobalt-based oxide may have a R-3m rhombohedral layered structure. A surface coating portion having a spinel crystalline structure may be formed on the lithium cobalt-based oxide. Here, the surface coating portion may contain, for example, a lithium cobalt-based oxide A. The lithium cobalt-based oxide A may be, for example, $LiCo_2O_4$. Here, the lithium cobalt-based oxide A may be distinguished from the lithium cobalt-based oxide, which is a core active material.

In the composite positive active material according to an embodiment, a reaction area of the composite positive active material and an electrolyte may be reduced due to the presence of the particle coating portion and the surface coating portion, such that a side reaction of the composite positive active material and the electrolyte is effectively suppressed or reduced.

Also, in the lithium cobalt-based oxide, the first lithium zirconium-based oxide is positioned spaced apart from the surface on which the particle coating portion is formed. For example, the first lithium zirconium-based oxide may be spaced apart from the first surface and/or the second surface of the lithium cobalt-based oxide in the first inner portion and/or the second inner portion contacting the second surface of the lithium cobalt-based oxide.

In the composite positive active material according to an embodiment, the first lithium zirconium-based oxide may be included in a larger amount in a particle state at a position spaced apart from the first inner portion than at a position spaced apart from the second inner portion. For example, an amount of particles of the first lithium zirconium-based oxide at the position spaced apart from the first inner portion may be larger than an amount of particles of the first lithium zirconium-based oxide at the position spaced apart from the second inner portion. Due to the presence of the first lithium zirconium-based oxide, the composite positive active material has excellent surface stabilization, surface phase transition suppression effects at high voltage (e.g., reduces surface phase transition at high voltage), and further improved conductivity (e.g., electrical conductivity).

A lithium-deficient cobalt oxide phase having a molar ratio of lithium to cobalt of 0.9 or less may be included in a portion in contact (e.g., physical contact) with the particle coating portion in the lithium cobalt-based oxide. Here, the lithium-deficient cobalt oxide phase may have a p-semiconductor characteristic, which may improve electrical conductivity of the composite positive active material, and may exhibit excellent capacity, lifespan and output characteristics, especially under high voltage conditions.

The composite positive active material according to one or more embodiments may be a lithium cobalt-based oxide. A particle coating portion may be in an island form on a surface (e.g., a first surface) of the lithium cobalt-based oxide, and a surface coating portion may be in a first inner portion of the lithium cobalt-based oxide that may be in contact (e.g., physical contact) with or adjacent to another surface (e.g., a second surface) of the lithium cobalt-based oxide.

The particle coating portion may include a first coating layer containing a lithium titanium-based oxide (e.g., a first lithium titanium-based oxide).

A second coating layer containing a second lithium zirconium-based oxide may be further included on the first coating layer. The surface coating portion may include a third coating layer having a spinel crystalline structure, and a lithium-deficient cobalt oxide phase that is in a lithium-deficient state, having a molar ratio of lithium to cobalt of 0.9 or less, may be included in the first inner portion of the lithium cobalt-based oxide that is in contact (e.g., physical contact) with the particle coating portion.

The lithium cobalt-based oxide may include magnesium and aluminum. The content of aluminum (Al) in the lithium cobalt-based oxide may be 4,000 parts per million (ppm) or greater, for example, about 4,000 ppm to about 6,000 ppm. As used herein, a ppm content of aluminum means a mass of aluminum per million of the total mass of the positive active material.

The content of aluminum may be in a range of about 1.5 mol % to about 3.0 mol % or about 2.0 mol % to about 2.5 mol % based on the total amount (e.g., moles) of metals excluding lithium in the core active material. When the content of aluminum is within the foregoing range, structural stability of the composite positive active material may be improved to obtain a composite positive active material having a high voltage characteristic, reduced capacity reduction, and reduced resistance increase. The content of magnesium (Mg) in the lithium cobalt-based oxide may be 1,000 ppm or greater, for example, about 1,000 ppm to about 1,500 ppm. As used herein, a ppm content of magnesium means a mass of magnesium per million of the total mass of the positive active material.

The content of magnesium may be in a range of about 0.25 mol % to about 0.7 mol %, or about 0.3 mol % to about 0.6 mol % based on the total amount (e.g., moles) of metals of the core active material. In the composite positive active material according to an embodiment, the titanium content may be in a range of about 500 ppm to about 800 ppm, and the zirconium content may be in a range of about 2,100 ppm to about 4,000 ppm. As used herein, a ppm content of titanium means a mass of titanium per million of the total mass of the positive active material. As used herein, a ppm content of zirconium means a mass of zirconium per million of the total mass of the positive active material.

Even when the content of aluminum in the composite positive active material is 4,000 ppm or greater as described above, as the Al content increases, diffusion of aluminum into the coating layer may hardly occur, and some Al may be doped into Li sites, thereby stabilizing the structure. Therefore, the composite positive active material may have excellent high-temperature characteristics and improved surface resistance, resulting in excellent conductivity (e.g., electrical conductivity). Therefore, the composite positive active material may improve structural stability of the crystalline structure of lithium cobalt-based oxide even under high-temperature and high-voltage environments. Accordingly, it is possible to implement a positive active material having excellent lifespan, storage characteristics, and improved resistance characteristics.

In this specification, the term "high voltage" means a voltage in a range of about 4.3 V to about 4.8 V.

In the composite positive active material according to one or more embodiments, a content ratio of magnesium to cobalt (number of moles of magnesium/number of moles of cobalt) included in the lithium-deficient cobalt oxide phase may be greater than a content ratio of magnesium to cobalt (number of moles of magnesium/number of moles of cobalt) included in the lithium cobalt-based oxide. Such a content distribution of magnesium may be formed by migration of magnesium in the lithium cobalt-based oxide by the Mg—Ti Kirkendall effect.

FIG. 1A is a schematic view illustrating an embodiment of a structure of a composite positive active material.

As shown in FIG. 1A, a composite positive active material 10 may include a particle coating portion 12 and a surface coating portion 13 on at least one surface of a lithium cobalt-based oxide 11, e.g., a first surface 17*a*, and the particle coating portion 12 and the surface coating portion 13 may have a layered form.

Figure 1B:
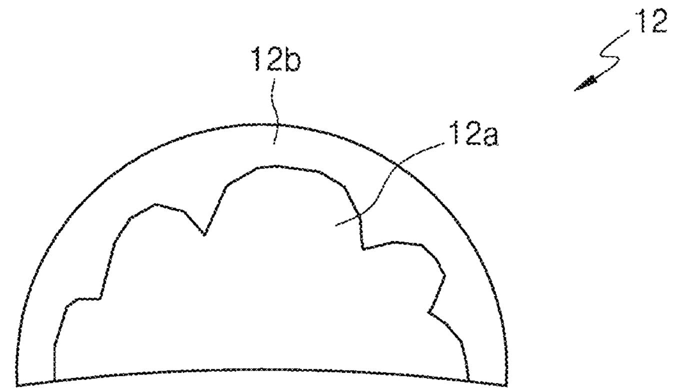
FIG. 1B is an enlarged view of a portion of a particle coating portion in FIG. 1A.

As shown in FIG. 1B, the particle coating portion 12 may include a first coating layer 12*a* containing a lithium titanium-based oxide (e.g., a first lithium titanium-based oxide) in contact (e.g., physical contact) with the lithium cobalt-based oxide and a second coating layer 12*b* containing a second lithium zirconium-based oxide on the first coating layer 12*a*.

Figure 1C:
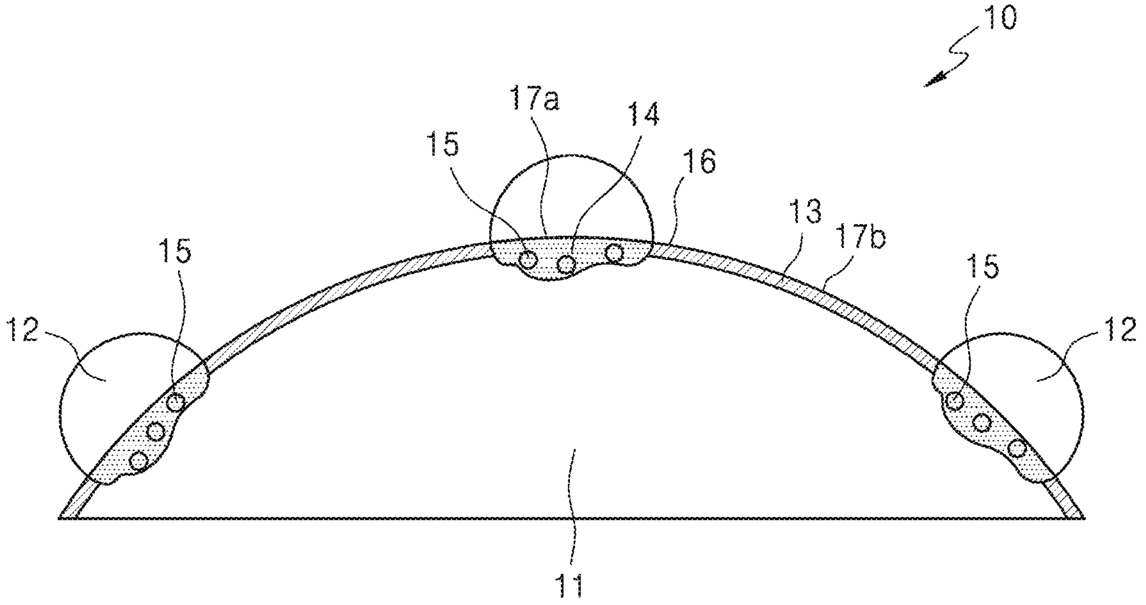
FIG. 1C is a schematic view illustrating a portion of a structure of a composite positive active material according to another embodiment.
Figure 1D:
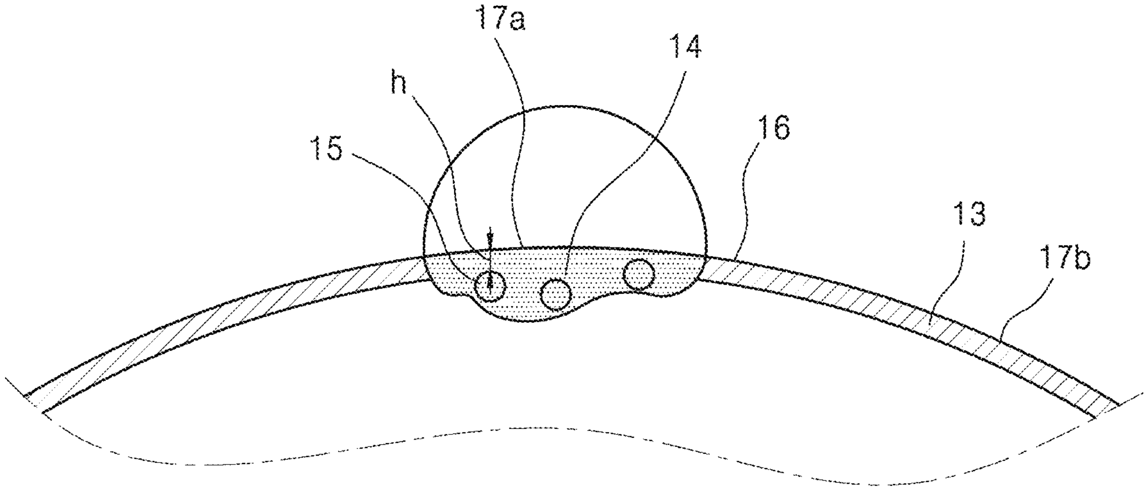
FIG. 1D is an enlarged view of a portion of FIG. 1C.

A first lithium zirconium-based oxide 15 may be spaced apart from the first surface 17*a* in contact (e.g., physical contact) with the particle coating portion 12. As shown in FIG. 1D, the first lithium zirconium-based oxide 15 may be spaced apart from the first surface 17*a* at a distance h. The distance h may be 150 nm or less or 140 nm or less, for example, about 90 nm to about 140 nm.

The first lithium zirconium-based oxide 15 may be in a particle state and may be in an island form. The particle size of the first lithium zirconium-based oxide 15 may be in a range of about 0.5 μm to about 3 μm. As shown in FIG. 1A, the first lithium zirconium oxide 15 may be distributed to be spaced apart from one another along an x-axis direction.

Figure 1E:
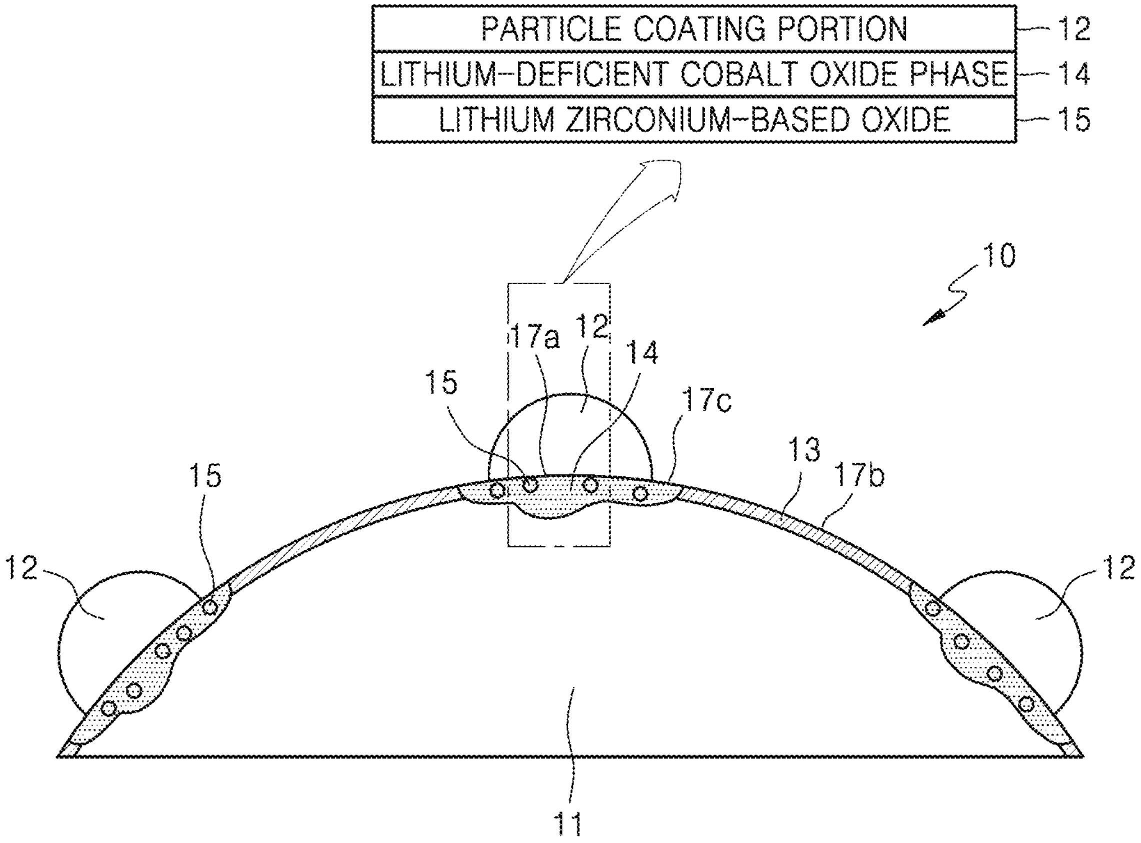
FIG. 1E is another schematic view of the portion of the structure of the composite positive active material according to the embodiment of FIG. 1A including an enlarged schematic view of a portion of FIG. 1A.

FIG. 1E includes an enlarged schematic view of a portion of FIG. 1A. The particle coating portion 12 may be on the lithium cobalt-based oxide, and a lithium-deficient cobalt oxide phase 14 may be under the particle coating portion 12. The first lithium zirconium-based oxide 15 may be under the lithium-deficient cobalt oxide phase 14. As shown in FIG. 1E, the lithium-deficient cobalt oxide phase 14 and the first lithium zirconium-based oxide 15 may respectively be present in separate layers. In some embodiments, the lithium-deficient cobalt oxide phase 14 and the first lithium zirconium-based oxide 15 may both be present in one layer (e.g., in a same layer).

In the present specification, the term "particle size" indicates the average particle diameter when the particle is spherical, and indicates a major axis length when the particle is non-spherical such as plate-shaped or needle-shaped. The particle size may be identified through a particle size meter, a scanning electron microscope (SEM), and/or a transmission electron microscope (TEM). The average particle diameter may be, for example, D50.

The term "D50," as used herein, refers to the average diameter of particles whose cumulative volume corresponds to 50% by volume in the accumulated particle size distribution, unless otherwise defined herein. The term "D50," as used herein, refers to a diameter corresponding to 50% in the accumulated particle size distribution curve, when the total number of particles is 100% in the accumulated particle size distribution curve in which particles are sequentially accumulated in the order of a particle having the smallest size to a particle having the largest size. The average particle diameter D50 may be measured by using one or more suitable methods available in the art such as, for example, a method using a particle size analyzer (e.g., a HORIBA, LA-950 laser particle size analyzer), transmission electron microscopy (TEM), and/or scanning electron microscopy (SEM). In some embodiments, for example, after a measurement apparatus using dynamic light-scattering is used, data analysis may be performed to count the number of particles for each of the particle size ranges, which will provide the average particle diameter D50 values. In the Examples, the average particle diameter is measured by using transmission electron microscopy (TEM), or scanning electron microscopy (SEM).

The first lithium zirconium-based oxide 15 may be present outside the first inner portion and/or may be present in the first inner portion in which the lithium-deficient cobalt oxide phase 14 described herein.

In some embodiments, the first lithium zirconium-based oxide 15 may also be present in the second inner portion in contact (e.g., physical contact) with the second surface 17*b* of the lithium cobalt-based oxide.

In some embodiments, the first lithium zirconium-based oxide 15 may be present under the particle coating portion 12. In this embodiment, the first lithium zirconium-based oxide 15 may have a layered-structure. The presence and the crystalline structure of the first lithium zirconium-based oxide may be identified by HR-TEM. The layered-structure of the first lithium zirconium-based oxide described above may be maintained even after repeatedly charging and discharging the lithium secondary battery. Here, the number of charging and discharging cycles may be, for example, 100 times or greater.

In FIG. 1A, the particle coating portion 12 has a semicircular shape, but is not limited thereto. When the particle coating portion exists in an island form, a surface resistance of the composite positive active material may be further improved, as compared with the particle coating portion of a continuous form (e.g., as compared with a similar lithium titanium-based oxide that continuously (e.g., completely) coats a lithium cobalt-based oxide). The size of the particle coating portion may be 3.0 μm or less, for example, about 0.5 μm to about 3 μm. Here, a size of the particle coating part refers to the thickness, which may be measured by using a scanning electron microscope (SEM) or a transmission electron microscope (TEM). In this specification, a "thickness" of the particle coating portion refers to a distance in a direction from an outer surface of the lithium cobalt oxide particle to an outer surface of the particle coating portion.

The surface coating portion 13 may be present in the second inner portion in contact (e.g., physical contact) with the second surface 17*b* of the lithium cobalt-based oxide 11. The surface coating portion 13 may contain a third coating layer having a spinel crystalline structure. The presence of such a surface coating portion may improve high temperature lifespan characteristics of the composite positive active material.

The lithium-deficient cobalt oxide phase 14, which is in a lithium-deficient state having a molar ratio of lithium to cobalt of 0.9 or less, and is in the first inner region contacting (e.g., physically contacting) the particle coating portion 12 in the lithium cobalt-based oxide 11, may be included. The lithium-deficient cobalt oxide phase 14 may be present in a portion within 1.3 μm or less, 1 μm or less, 900 nm or less, 800 nm or less, 500 nm or less, or 100 nm or less of the outermost surface of lithium cobalt-based oxide, and/or the lithium-deficient cobalt oxide phase 14 may be present in a portion within a distance of 90% to 100% from the particle center for a radius of the lithium cobalt-based oxide. The presence of the lithium-deficient cobalt oxide phase 14 may be identified by SEM and/or TEM analysis.

In the present specification, the first surface 17*a*, as shown in FIG. 1A, refers to one surface of the lithium cobalt-based oxide 11 on which the particle coating layer 12 is formed. The second surface 17*b* refers to another surface of the lithium cobalt-based oxide 11 on which the surface coating portion 13 is formed. The third surface 17*c* refers to still another surface of the lithium cobalt-based oxide 11 that may be in contact (e.g., physical contact) with the particle coating portion 12 and may include the lithium-deficient cobalt oxide phase 14.

As shown in FIG. 1A, the whole surface of the composite positive active material may include the first surface 17*a*, the second surface 17*b*, and the third surface 17*c*. But as shown in FIG. 1C, the whole surface of the composite positive active material may include the first surface 17*a* and the second surface 17*b* and not include a third surface. For example, in some embodiments, the whole surface of the lithium cobalt-based oxide may include a first surface and a second surface or a first surface, a second surface, and a third surface. The first surface may be present in the first inner portion of the lithium cobalt-based oxide, and the second surface may be present in the second inner portion of the lithium cobalt-based oxide. The third surface may be present in the first inner portion as shown in FIG. 1A.

In the composite positive active material according to an embodiment, the lithium-deficient cobalt oxide may have a spinel crystalline structure ($CO_3O_4$ spinel phase (Fd-3m)). A content of the lithium-deficient cobalt oxide phase may be in a range of about 0.1 parts to about 1 part by weight, based on 100 parts by weight of the lithium cobalt-based oxide.

The lithium-deficient cobalt oxide phase may include, for example, a compound represented by Formula 5, a compound represented by Formula 5-1, a compound represented by Formula 5-2, or a combination thereof:

Formula 5

$$Li_{1-\alpha}Mg_aCo_{1-x}M_xO_2$$

wherein, in Formula 5, M may be W, Mo, Zr, Ti, Mg, Ta, Al, Fe, V, Cr, Ba, Ca, Nb, or a combination thereof, $0.01\le\alpha\le0.5$, $0\le a\le0.05$, and $0\le x\le0.05$, Formula 5-1

$$Li_{1-\alpha}Mg_aCo_{2-x}M_xO_4$$

wherein, in Formula 5-1, M may be W, Mo, Zr, Ti, Mg, Ta, Al, Fe, V, Cr, Ba, Ca, Nb, or a combination thereof, $0.01\le\alpha\le0.5$, $0\le a\le0.05$, and $0\le x\le0.05$, Formula 5-2

$$Co_{3-x}M_xO_4$$

wherein, in Formula 5-2, M may be W, Mo, Zr, Ti, Mg, Ta, Al, Fe, V, Cr, Ba, Ca, Nb, or a combination thereof, and $0\le x\le0.05$.

The lithium-deficient cobalt oxide phase may include, for example, $Co_3O_4$, $LiCo_2O_4$, $Li_{0.8}Mg_{0.007}CoO_2$, or a combination thereof.

The composite positive active material 10 may include the particle coating portion 12 such that the resistance (e.g., electrical resistance such as, for example, sheet resistance) may be maintained to be low due to the conductive material coating (e.g., the electrically conductive material coating), and excellent surface stabilization effect may be obtained due to the formation of the surface coating portion 13.

The first lithium zirconium-based oxide 15 in the composite positive active material may be, for example, represented by Formula 6:

Formula 6

$$Li_{2+a}Zr_{(1-x-z)}Co_zM1_xO_3$$

wherein, in Formula 6, M1 may be at least one element selected from the group consisting of boron (B), magnesium (Mg), calcium (Ca), strontium (Sr), barium (Ba), titanium (Ti), vanadium (V), chromium (Cr), iron (Fe), copper (Cu), and aluminum (Al), and $-0.1\le a\le0.1$, $0\le x<1$, and $0\le z\le0.5$.

The compound represented by Formula 6 may be, for example, $Li_2Zr_{0.95}Co_{0.05}O_3$.

The thickness of the particle coating portion 12 may be, for example, about 100 nm to about 500 nm.

In one embodiment, the particle coating portion 12 may include a first coating layer.

According to one or more embodiments, as shown in FIG. 1B, the particle coating portion 12 may have a structure in which the second coating layer 12*b* may be on the first coating layer 12*a*, and a boundary between the first coating layer 12*a* and the second coating layer 12*b* may be formed non-uniformly. In FIG. 1B, the boundary between the first coating layer 12*a* and the second coating layer 12*b* is non-uniform, however, in some embodiments, the boundary may be formed uniformly (e.g., substantially uniformly).

The thickness of the first coating layer 12*a* and the thickness of the second coating layer 12*b* are variable, but, for example, the thickness of the first coating layer 12*a* may be greater than the thickness of the second coating layer 12*b*. The thickness of the first coating layer 12*a* may be in a range of about 100 nm to about 500 nm, and the thickness of the second coating layer 12*b* may be in a range of about 100 nm to about 300 nm. When the thickness of the first coating layer and the thickness of the second coating layer are within these ranges, a composite positive active material having improved surface resistance may be obtained.

The surface coating portion 13 may contain a third coating layer having a spinel crystalline structure. The thickness of the third coating layer may be, for example, about 10 nm to about 100 nm. The third coating layer may contain, for example, lithium cobalt-based oxide A.

In this specification, a "thickness" of the particle coating portion refers to a distance in a direction from an outer surface of the lithium cobalt oxide particle to an outer surface of the particle coating portion. A thickness of the first coating layer refers to a distance in a direction from an outer surface of the lithium cobalt oxide particle to an outer surface of first coating layer. A thickness of the second coating layer refers to a distance from an outer surface of the first coating layer to an outer surface of the particle coating portion. A thickness of the third coating layer refers to a distance from an outer surface of the first coating layer to an inner surface of the third coating layer. Thickness can be determined by SEM or TEM analysis of a cross-section of a particle. Thickness may be determined by an average distance if the coating layer has an uneven thickness. In Examples, the thickness is measured by SEM or TEM analysis In the particle coating portion, a content of the lithium titanium-based oxide may be in a range of about 0.05 parts to about 1.0 parts by weight, based on 100 parts by weight of the lithium cobalt-based oxide, and a content of the second lithium zirconium-based oxide may be in a range of about 0.05 parts to about 0.2 parts by weight, based on 100 parts by weight of the lithium cobalt-based oxide. When a content of the second lithium zirconium-based oxide and a content of the lithium zirconium cobalt oxide are within these ranges, as the lithium-ion diffusion coefficient increases, and the electrical conductivity increases, a composite positive active material having a stabilized structure, suppressed (e.g., reduced) side reaction with electrolyte, and suppressed (e.g., reduced) cobalt dissolution may be prepared.

A content of the lithium cobalt-based oxide A in the third coating layer of the surface coating portion may be in a range of about 0.01 parts to about 1 part by weight, based on 100 parts by weight of the lithium cobalt-based oxide. The lithium cobalt-based oxide A may be, for example, $LiCo_2O_4$, and when a content of the lithium cobalt-based Compound A is within this range, electrical conductivity may be improved.

When a content of the lithium titanium-based oxide in the first coating layer in the particle coating portion, a content of the second lithium zirconium-based oxide in the second coating layer, and a content of the lithium cobalt oxide A in the surface coating portion are within these ranges, as the lithium-ion diffusion coefficient increases, and the electrical conductivity increases, a composite positive active material having a stabilized structure and suppressed (e.g., reduced) side reaction with electrolyte may be prepared.

The lithium titanium-based oxide in the first coating layer may be, for example, a compound represented by Formula 1:

Formula 1

$$Li_{2+a}Ti_{(1-x-y)}Co_xMg_yO_3$$

wherein, in Formula 1, $-0.1 \le a \le 0.1$, $0 < x \le 0.5$, and $0 < y \le 0.1$.

In Formula 1, x may be, for example, about 0.01 to about 0.3, about 0.01 to about 0.2, about 0.01 to about 0.1, or about 0.01 to about 0.05, and y may be, for example, about 0.01 to about 0.08, about 0.01 to about 0.05, or about 0.01 to about 0.03.

The lithium titanium-based oxide may be, for example, $Li_2Ti_{0.97}Co_{0.02}M_{0.01}O_3$.

The second lithium zirconium-based oxide in the second coating layer may be, for example, a compound represented by Formula 2:

Formula 2

$$Li_{2+a}Zr_{(1-x-z)}Co_zM2_xO_3$$

wherein, in Formula 2, M2 may be at least one element selected from the group consisting of boron (B), magnesium (Mg), calcium (Ca), strontium (Sr), barium (Ba), titanium (Ti), vanadium (V), chromium (Cr), iron (Fe), copper (Cu), and aluminum (Al), and $-0.1 \le a \le 0.1$, $0 \le x < 1$, and $0 \le z \le 0.1$.

In Formula 2, z may be in a range of about 0.01 to about 0.1, about 0.01 to about 0.08, or about 0.01 to about 0.05.

The second lithium zirconium-based oxide may be, for example, $Li_2Zr_{0.99}Co_{0.01}O_3$.

The core active material, the lithium cobalt-based oxide, may be, for example, a compound represented by Formula 3:

Formula 3

$$Li_{a-b}Mg_bCo_{(1-x-y-b)}Al_xM3_yO_2$$

wherein, in Formula 3, $0.9 \le a \le 1.1$, $0 \le b \le 0.02$, $0 \le x \le 0.04$, and $0 \le y \le 0.01$, and M3 may be one selected from Ni, K, Na, Ca, Mg, Si, Fe, Cu, Zn, Ti, Sn, V, Ge, Ga, B, P, Se, Bi, As, Zr, Mn, Cr, Ge, Sr, Sc, Y, and a combination thereof.

The lithium cobalt-based oxide may be a compound represented by Formula 4:

Formula 4

$$Li_{a-b}Mg_bCo_{(1-x-b)}Al_xO_2$$

wherein, in Formula 4, $0.9 \le a \le 1.1$, $0.001 \le b \le 0.01$, and $0.01 < x \le 0.03$.

In Formula 1, a may be, for example, about 0.9 to about 1.05.

In Formulae 3 and 4, $0.015 < x \le 0.03$ and $0.005 \le b \le 0.01$.

In the composite positive active material according to an embodiment, the total thickness of the first coating layer and the second coating layer may be in a range of about 200 nm to about 800 nm, and the thickness of the third coating layer may be 100 nm or less, for example, about 10 nm to about 50 nm.

The second coating layer may be on the first coating layer, and the interface between the first coating layer and the second coating layer may be uniform or non-uniform. In the composite positive active material according to an embodiment, a ratio of the thickness in the first coating layer to a thickness in the second coating layer may be in a range of about 1.1:1 to about 1.5:1. The ratio of major axis lengths may be obtained by scanning electron microscope (SEM) and/or transmission electron microscope (TEM) analysis. A thickness of the first coating layer refers to a distance in a direction from an outer surface of the lithium cobalt oxide particle to an outer surface of first coating layer. A thickness of the second coating layer refers to a distance from an outer surface of the first coating layer to an outer surface of the particle coating portion.

The lithium cobalt-based oxide according to one or more embodiments may be small particles, large particles, or a mixture of small particles and large particles.

The size of the large particle may be in a range of about 10 μm to about 20 μm, and the size of the small particle may be in a range of about 3 μm to about 6 μm. A mixing weight ratio of large particles to small particles in the mixture of small particles and large particles may be in a range of about 7:3 to about 9:1, about 8:2 to about 9:1, or for example, about 5:1 to about 7:1. When a mixing weight ratio of the large particle and the small particle is within any of these ranges, high-temperature lifespan and high-temperature storage characteristics may be improved.

The size of the large particle may be in a range of about 10 μm to about 20 μm, about 17 μm to about 20 μm, or for example, about 18 μm to about 20 μm. The size of the small particle may be in a range of about 3 μm to about 6 μm, for example, about 3 μm to about 5 μm, or about 3 μm to about 4 μm.

The composite positive active material according to one or more embodiments may have a layered-crystalline structure, and a specific surface area may be in a range of about 0.1 $m^2/g$ to about 3 $m^2/g$.

A lithium secondary battery may include: a positive electrode that may include the composite positive active material described herein; a negative electrode; and an electrolyte between the positive electrode and the negative electrode.

In the lithium secondary battery according to an embodiment, the first lithium zirconium-based oxide may be spaced apart from a surface on which the particle coating portion is formed in the lithium cobalt-based oxide even after repeated charging and discharging cycles.

Hereinafter, a method of preparing the composite positive active material according to an embodiment will be described in more detail.

First, a method of preparing the large particle lithium cobalt-based oxide and the small particle lithium cobalt-based oxide, which are used for preparing the composite positive active material, is as follows.

To prepare a large particle lithium cobalt-based oxide, a cobalt precursor having a size of 4 μm to 7 μm, a lithium precursor, and a metal precursor, may be mixed together to obtain a first mixture.

In some embodiments, a precursor mixture may be obtained by mixing while stoichiometrically controlling a mixing ratio of the lithium precursor, the cobalt precursor, and the metal precursor to obtain the desired lithium cobalt-based oxide represented by Formula 3:

Formula 3

$$Li_{a-b}Mg_bCo_{(1-x-y-b)}Al_xM3_yO_2$$

wherein, in Formula 3, 0.9≤a≤1.1, 0≤b≤0.02, 0≤x≤0.04, and 0≤y≤0.01, and

M3 may be one selected from Ni, K, Na, Ca, Mg, Si, Fe, Cu, Zn, Ti, Sn, V, Ge, Ga, B, P, Se, Bi, As, Zr, Mn, Cr, Ge, Sr, Sc, Y, and a combination thereof.

The metal precursor may be, for example, at least one selected from a magnesium precursor, an aluminum precursor, and an M3 precursor.

The lithium precursor may be at least one selected from lithium hydroxide (LiOH), lithium carbonate ($Li_2CO_3$), lithium chloride, lithium sulfate ($Li_2SO_4$), and lithium nitrate ($LiNO_3$). The cobalt precursor may be at least one selected from cobalt carbonate, cobalt hydroxide, cobalt chloride, cobalt sulfate, and cobalt nitrate. The aluminum precursor may be at least one selected from aluminum sulfate, aluminum chloride, and aluminum chloride, and the magnesium precursor may be at least one selected from magnesium sulfate, magnesium chloride, and magnesium hydroxide.

The M3 precursor may be at least one selected from a chloride, a sulfate, a hydroxide, and an oxide, containing M3 of Formula 3.

The mixing may be performed, for example, by dry mixing such as mechanical mixing by using a ball mill, a bambari mixer, a homogenizer, and/or a Hensel mixer. The dry mixing may reduce manufacturing cost, as compared with wet mixing.

The size of the cobalt precursor used in preparing the first mixture may be, for example, 4 μm to 6.0 μm. When the size of the cobalt precursor is less than 4 μm or more than 7 μm, it is difficult to prepare a large particle lithium cobalt-based oxide.

Subsequently, a large particle lithium cobalt-based oxide may be obtained by primary heat-treating the first mixture in an air or oxygen atmosphere (e.g., an ambient air atmosphere or an atmosphere including an oxygen concentration higher than that of the ambient air atmosphere such as, for example, an oxygen concentration up to 100%).

The particle size of the large particle lithium cobalt-based oxide may be in a range of 10 μm to 20 μm, about 17 μm to about 21 μm, or, for example, about 18 μm to about 20 μm, for example, 19 μm.

To prepare a small particle lithium cobalt-based oxide, a cobalt precursor having a size of 2 μm to 3 μm, a lithium precursor, and a metal precursor, may be mixed together to obtain a second mixture. The second mixture may be subjected to the primary heat-treating to prepare a small particle lithium cobalt-based oxide. The metal precursor used herein may be identical to the metal precursor used in preparing the first mixture.

The size of the small particle lithium cobalt-based oxide may be 3 μm to 6 μm, for example, 3 μm to 5 μm, or 3 μm to 4 μm.

When the size of the cobalt precursor used in preparing the small particle lithium cobalt-based oxide is less than 2 μm, it is difficult to obtain the small particle lithium cobalt-based oxide having a suitable or desired size. When the size of the cobalt precursor greater than 4 μm, the density may be low when used in combination with the large particle.

In preparation of the large particle lithium cobalt-based oxide and the small particle lithium cobalt-based oxide, a mixing molar ratio (Li/Me) of lithium and metal (Me) other than lithium may be in a range of about 0.9 to about 1.1, about 1.01 to about 1.05, or, for example, about 1.02 to about 1.04.

In preparing the large particle lithium cobalt-based oxide and the small particle lithium cobalt-based oxide, the temperature increase rate may be in a range of about 4° C./min to about 6° C./min. When the temperature increase rate is carried out in the range, cation mixing may be prevented or reduced. When the temperature increase rate is lower than 4° C., the phase stability improvement at high voltage is insignificant.

The large particle lithium cobalt-based oxide and the small particle lithium cobalt-based oxide may be mixed together in a weight ratio of about 8:2 to about 1:9, and a titanium precursor and cobalt hydroxide may be mixed thereto to obtain a first precursor mixture, followed by heat-treating.

The content of the cobalt hydroxide may be in a range of about 3.5 parts to about 7 parts by weight, about 4 parts to about 6 parts by weight, about 4.5 parts to about 5.5 parts by weight, or 5 parts by weight, based on 100 parts by weight of the lithium cobalt-based oxide. When the content of the cobalt hydroxide is within any of these ranges, a suitable or desired lithium-deficient cobalt oxide phase may be formed.

The heat-treating may be performed at about 850° C. to about 980° C., and the heat increase rate may be in a range of about 2° C./min to about 10° C./min, for example, about 4° C./min to about 6° C./min. When the heat increase rate is within any of these ranges, a spinel structure may be formed in the surface coating portion.

The heat-treating may be performed in air or oxygen atmosphere (e.g., an ambient air atmosphere or an atmosphere including an oxygen concentration higher than that of the ambient air atmosphere such as, for example, an oxygen concentration up to 100%). Here, the oxygen atmosphere may be formed by using oxygen alone or by using oxygen, and an inert gas such as nitrogen together (e.g., the oxygen atmosphere may be a mixture of oxygen and the inert gas having any suitable concentration of oxygen).

According to the above process, the product of the primary heat treatment may be mixed together with a zirconium precursor to obtain a second precursor mixture and the second precursor mixture may be heat-treated. The heat-treating the second precursor mixture may be performed at 950° C. to 1,000° C.

A composite positive active material in which the first lithium zirconium-based oxide is present in the inner portion of the lithium cobalt-based oxide, which may be heat-treated in the above temperature range, may be obtained. The heat increase rate may be in a range of about 2° C./min to about 10° C./min, for example, about 4° C./min to about 6° C./min. When the heat increase rate is within any of these ranges, surface structure characteristics of the composite positive active material may be controlled.

The titanium precursor may be, for example, titanium oxide, titanium hydroxide, titanium chloride, or a combination thereof. The cobalt hydroxide may have excellent chemical reactivity, as compared with cobalt oxide. When cobalt oxide is used as a cobalt precursor, the particle size of the cobalt oxide is large, so only an island-form coating layer may be formed, and a coating layer according to an embodiment may not be formed.

The cobalt hydroxide may have an average particle diameter of about 50 nm to about 300 nm or about 100 nm to about 200 nm. The composite positive active material according to an embodiment having a suitable or desired coating layer may be prepared by using cobalt hydroxide having a size within any of these ranges. The average particle diameter may be confirmed through SEM, TEM, and/or the like and/or evaluated by using a particle size analyzer.

The content of the zirconium precursor may be controlled such that the content of zirconium may be in a range of about 4,500 ppm to about 6,750 ppm in the composite positive active material, for example, about 0.6 parts to about 1.4 parts by weight based on 100 parts by weight of the lithium cobalt-based oxide. The content of the titanium precursor may be adjusted such that the content of zirconium in the composite positive active material may be in a range of about 500 ppm to about 800 ppm.

The zirconium precursor may be zirconium oxide, zirconium hydroxide, zirconium chloride, zirconium sulfate, or a combination thereof.

The composite positive active material according to an embodiment may be prepared according to general manufacturing methods such as spray pyrolysis in addition to the above-described solid phase method.

According to one or more embodiments, a lithium secondary battery may contain the composite positive active material for a lithium secondary battery. The lithium secondary battery may be manufactured as follows.

A positive electrode may be prepared by the following method.

The composite positive active material according to one or more embodiments as a positive active material, a binder, and a solvent may be mixed together to prepare a positive active material composition. The positive active material composition may be added together with a conductive agent. In one or more embodiments, the positive active material composition may be directly coated on a metallic current collector and then dried to prepare a positive electrode plate. In one or more embodiments, the positive active material composition may be cast on a separate support to form a positive active material film, which may then be separated from the support and laminated on a metallic current collector to prepare a positive electrode plate. When preparing the positive electrode, a first positive active material that may be any suitable positive active material in a lithium secondary battery generally used in the art may be further included. The first positive active material may further include at least one selected from the group consisting of lithium cobalt oxide, lithium nickel cobalt manganese oxide, lithium nickel cobalt aluminum oxide, lithium iron phosphorous oxide, and lithium manganese oxide, but embodiments are not limited thereto. Any suitable positive active material available generally used in the art may be used. In some embodiments, the first positive active material may be a compound represented by one of: $Li_aA_{1-b}B_bD_2$ (wherein $0.90 \leq a \leq 1.8$ and $0 \leq b \leq 0.5$); $Li_aE_{1-b}B_bO_{2-c}D_c$ (wherein $0.90 \leq a \leq 1.8$, $0 \leq b \leq 0.5$, and $0 \leq c \leq 0.05$); $LiE_{2-b}B_bO_{4-c}D_c$ (wherein $0 \leq b \leq 0.5$ and $0 \leq c \leq 0.05$); $Li_aNi_{1-b-c}Co_bB_cD_\alpha$ (wherein $0.90 \leq a \leq 1.8$, $0 \leq b \leq 0.5$, $0 \leq c \leq 0.05$, and $0 < \alpha \leq 2$); $Li_aNi_{1-b-c}Co_bB_cO_{2-\alpha}F_\alpha$ (wherein $0.90 \leq a \leq 1.8$, $0 \leq b \leq 0.5$, $0 \leq c \leq 0.05$, and $0 < \alpha < 2$); $Li_aNi_{1-b-c}Mn_bB_cD_\alpha$ (wherein $0.90 \leq a \leq 1.8$, $0 \leq b \leq 0.5$, $0 \leq c \leq 0.05$, and $0 < \alpha \leq 2$); $Li_aNi_{1-b-c}Mn_bB_cO_{2-\alpha}F_\alpha$ (wherein $0.90 \leq a \leq 1.8$, $0 \leq b \leq 0.5$, $0 \leq c \leq 0.05$, and $0 < \alpha < 2$); $Li_aNi_bE_cG_dO_2$ (wherein $0.90 \leq a \leq 1.8$, $0 \leq b \leq 0.9$, $0 \leq c \leq 0.5$, and $0.001 \leq d \leq 0.1$); $Li_aNi_bCo_cMn_dGeO_2$ (wherein $0.90 \leq a \leq 1.8$, $0 \leq b \leq 0.9$, $0 \leq c \leq 0.5$, $0 \leq d \leq 0.5$, and $0.001 \leq e \leq 0.1$); $Li_aNiG_bO_2$ (wherein $0.90 \leq a \leq 1.8$ and $0.001 \leq b \leq 0.1$); $Li_aCoG_bO_2$ (wherein $0.90 \leq a \leq 1.8$ and $0.001 \leq b \leq 0.1$); $Li_aMnG_bO_2$ (wherein $0.90 \leq a \leq 1.8$ and $0.001 \leq b \leq 0.1$); $Li_aMn_2G_bO_4$ (wherein $0.90 \leq a \leq 1.8$ and $0.001 \leq b \leq 0.1$); $QO_2$; $QS_2$; $LiQS_2$; $V_2O_5$; $LiV_2O_5$; $LiIO_2$; $LiNiVO_4$; $Li_{(3-f)}J_2(PO_4)_3$ (wherein $0 \leq f \leq 2$); $Li_{(3-f)}Fe_2(PO_4)_3$ (wherein $0 \leq f \leq 2$); and $LiFePO_4$. In the foregoing formulae, A may be nickel (Ni), cobalt (Co), manganese (Mn), or a combination thereof; B may be aluminum (Al), Ni, Co, Mn, chromium (Cr), iron (Fe), magnesium (Mg), strontium (Sr), vanadium (V), a rare-earth element, or a combination thereof; D may be oxygen (O), fluorine (F), sulfur (S), phosphorus (P), or a combination thereof; E may be Co, Mn, or a combination thereof; F may be F, S, P, or a combination thereof; G may be Al, Cr, Mn, Fe, Mg, lanthanum (La), cerium (Ce), Sr, V, or a combination thereof; Q may be titanium (Ti), molybdenum (Mo), Mn, or a combination thereof; I may be Cr, V, Fe, scandium (Sc), yttrium (Y), or a combination thereof; and J may be V, Cr, Mn, Co, Ni, copper (Cu), or a combination thereof.

A binder in the positive active material composition may be polyvinylidene fluoride (PVDF), vinylidene fluoride-hexafluoropropylene copolymer (PVDF-co-HFP), polyvinylalcohol, polyacrylonitrile, carboxymethyl cellulose (CMC), starch, hydroxypropyl cellulose, regenerated cellulose, polyvinyl pyrrolidone, tetrafluoroethylene, polyethylene, polypropylene, ethylene-propylene-diene polymer (EPDM), sulfonated-EPDM, styrene butadiene rubber (SBR), fluorine rubber, polyamideimide, polyacrylic acid (PAA), polyfluorinated vinylidene, polyvinylalcohol, carboxymethyl cellulose (CMC), starch, hydroxypropylcellulose, regenerated cellulose, polyvinyl pyrrolidone, tetrafluoroethylene, polyethylene, polypropylene, lithium polyacrylate, lithium polymethacrylate, ethylene-propylene-diene monomer (EPDM), sulfonated EPDM, styrene butadiene rubber, fluorine rubber, and/or various suitable copolymers.

The conductive agent may be any suitable material having suitable electrical conductivity without causing an undesirable chemical change in a battery. Examples of the conductive agent include graphite, such as natural graphite and/or artificial graphite; a carbonaceous material, such as carbon black, acetylene black, Ketjen black, channel black, furnace black, lamp black, and/or summer black; conductive fibers, such as carbon nanotubes, carbon fibers and/or metal fibers; fluorinated carbon; metal powder of aluminum and/or nickel; conductive whisker, such as zinc oxide and/or potassium titanate; a conductive metal oxide, such as titanium oxide; and a conductive material, such as a polyphenylene derivative.

The content of the conductive agent may be in a range of about 1 part to about 10 parts by weight or about 1 part to about 5 parts by weight, based on 100 parts by weight of the positive active material. When an amount of the conductive agent is within this range, conductivity (e.g., electrical conductivity) characteristics finally obtained may be excellent.

Example of the solvent include N-methyl pyrrolidone. An amount of the solvent may be in a range of about 20 parts to about 100 parts by weight based on 200 parts by weight of the positive active material. When the amount of the solvent is within this range, a process for forming the positive active material layer may be performed efficiently.

The positive electrode current collector is not particularly limited and may be any suitable material as long as the positive electrode current collector has a thickness in a range of 3 μm to 500 μm and suitable electrical conductivity without causing undesirable chemical change in a battery. Examples of the positive electrode current collector include stainless steel, aluminum, nickel, titanium, and sintered carbon; and aluminum or stainless steel, the aluminum and the stainless steel each being surface-treated with carbon, nickel, titanium, and/or silver. The positive electrode current collector may be processed to have fine bumps on surfaces thereof to enhance a binding force of the positive active material to the current collector. The positive electrode current collector may be used in any of various suitable forms including a film, a sheet, a foil, a net, a porous structure, a foam, and/or a non-woven fabric.

A plasticizer may further be added to the positive active material composition and/or the negative active material composition to form pores inside the electrode.

The amounts of the positive active material, the conductive agent, the binder, and the solvent may be in any suitable ranges that are generally used in lithium secondary batteries. At least one of the conductive agent, the binder, and the solvent may be omitted according to the use and the structure of the lithium secondary battery.

The negative electrode may be obtained by performing substantially the same method except for using a negative active material instead of a positive active material in the manufacturing of the positive electrode described above.

A carbonaceous material, silicon, silicon oxide, a silicon-based alloy, a silicon-carbonaceous material complex, tin, a tin-based alloy, a tin-carbon complex, metal oxide, or a combination thereof may be used as a negative active material.

Examples of the carbonaceous material may include crystalline carbon, amorphous carbon, and mixtures thereof. Examples of the crystalline carbon may include graphite, such as natural graphite or artificial graphite, in shapeless, plate, flake, spherical, and/or fibrous form. Examples of the amorphous carbon may include soft carbon (carbon sintered at low temperatures), hard carbon, meso-phase pitch carbides, sintered cokes, graphene, carbon black, carbon nanotubes, and carbon fiber, but embodiments are not limited thereto. Any suitable carbonaceous material available in the art may be used.

The negative active material may be selected from the group consisting of Si, $SiO_x$ (wherein $0<x<2$, for example, 0.5 to 1.5), Sn, $SnO_2$, a silicon-containing metal alloy, and a mixture thereof. The silicon-containing metal alloy may include at least one metal selected from aluminum (Al), tin (Sn), silver (Ag), iron (Fe), bismuth (Bi), magnesium (Mg), zinc (Zn), indium (in), germanium (Ge), lead (Pb), and titanium (Ti).

For a negative active material, a metal and/or metalloid alloyable with lithium, an alloy thereof, and/or an oxide thereof may be used. Examples of the metal and/or metalloid alloyable with lithium include silicon (Si), tin (Sn), aluminum (Al), germanium (Ge), lead (Pb), bismuth (Bi), antimony (Sb), a Si—Y alloy (wherein Y is an alkali metal, an alkaline earth metal, a Group 13 element, a Group 14 element, a transition metal, a rare earth element, or a combination thereof, and Y is not Si), a Sn—Y alloy (wherein Y is an alkali metal, an alkaline earth-metal, a Group 13 element, a Group 14 element, a transition metal, a rare earth element, or a combination thereof, and Y is not Sn), and/or $MnO_x$ ($0<x\leq2$). Y may be magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), Thallium (TI), germanium (Ge), phosphorus (P), arsenic (As), antimony (Sb), bismuth (Bi), sulfur (S), selenium (Se), tellurium (Te), polonium (Po), or a combination thereof. For example, an oxide of the metal and/or metalloid alloyable with lithium may be a lithium titanium oxide, a vanadium oxide, a lithium vanadium oxide, $SnO_2$, and/or $SiO_x$ ($0<x<2$).

The negative active material may include, for example, at least one element selected from the group consisting of a Group 13 element, a Group 14 element, and a Group 15 element in the periodic table of elements. For example, the negative active material may include, for example, at least one element selected from the group consisting of Si, Ge, and Sn.

In the negative active material composition, the binder may be a water-insoluble binder, a water-soluble binder, or a combination thereof.

The water-insoluble binder may be ethylene propylene copolymer, polyacrylonitrile, polystyrene, polyvinyl chloride, carboxylated polyvinyl chloride, polyvinyl fluoride, polyurethane, polytetrafluoroethylene, polyvinylidene fluoride, polyethylene, polypropylene, polyamideimide, polyimide, or a combination thereof.

The water-soluble binder may be styrene-butadiene rubber (SBR), acrylated styrene-butadiene rubber (ABR), acrylonitrile-butadiene rubber, acrylic rubber, butyl rubber, fluorine rubber, a polymer including ethylene oxide, polyvinyl pyrrolidone, polyepichlorohydrin, polyphosphazene, ethylene propylene diene copolymer, polyvinyl pyridine, chlorosulfonated polyethylene, latex, polyester resin, acrylic resin, phenolic resin, epoxy resin, polyvinyl alcohol, or a combination thereof.

When a water-soluble binder is used as the negative electrode binder, a cellulose-based compound that may impart viscosity can be further included as a thickener. As the cellulose-based compound, carboxymethyl cellulose, hydroxypropylmethyl cellulose, methyl cellulose, and/or an alkali metal salt thereof may be used by mixing at least one thereof in the negative active material composition. As the alkali metal, Na, K, and/or Li may be used. A content of the thickener used may be in a range of about 0.1 parts to about 3 parts by weight, based on 100 parts by weight of the negative active material.

Examples of the conductive agent may be an electrically conductive material including: a carbonaceous material such as natural graphite, artificial graphite, carbon black, acetylene black, Ketjen black, and carbon fiber; a metal-based material including metal powders such as copper, nickel, aluminum, and/or silver and/or metal fibers; an electrically conductive polymer such as a polyphenylene derivative; or a mixture thereof.

In one or more embodiments, the solvent used for the negative active material composition may be the same as the solvent used for the positive active material composition. A content of the solvent may be any suitable amount generally used in a lithium secondary battery.

A separator may be between the positive electrode and the negative electrode. A thin film having excellent ion permeability, mechanical strength, and insulating properties (e.g., electrically insulating properties) may be used as a separator.

The separator may have a pore diameter in a range of about 0.01 μm to about 10 μm, and a thickness of about 5 μm to about 20 μm. Examples of the separator may include an olefin-based polymer, e.g., polypropylene, and a sheet and/or non-woven fabric formed of glass fiber and/or polyethylene. As an electrolyte, when a solid polymer electrolyte, such as a solid polymer, is used, the solid electrolyte may also serve as a separator.

Examples of the olefin-based polymers of the separator may include polyethylene, polypropylene, PVDF, and/or a multilayer film of two or more layers thereof, such as a mixed multilayer film, e.g., a polyethylene/polypropylene two-layered separator, a polyethylene/polypropylene/polyethylene three-layered separator, and a polypropylene/polyethylene/polypropylene three-layered separator.

When a nonaqueous electrolyte containing a lithium salt is used as an electrolyte, the nonaqueous electrolyte containing a lithium salt may include a nonaqueous electrolyte and a lithium salt.

Examples of the nonaqueous electrolyte may include a nonaqueous electrolyte solution, an organic solid electrolyte, and an inorganic solid electrolyte.

An example of the nonaqueous electrolyte solution may be an organic solvent. Any suitable organic solvent available in the art may be used as the organic solvent. For example, the organic solvent may be selected from propylene carbonate, ethylene carbonate, fluoroethylene carbonate, butylene carbonate, dimethylcarbonate, diethyl carbonate, methyl ethyl carbonate, methyl propyl carbonate, ethyl propyl carbonate, methyl isopropyl carbonate, dipropyl carbonate, dibutyl carbonate, benzonitrile, acetonitrile, tetrahydrofuran, 2-methyl tetrahydrofuran, γ-butyrolactone, dioxolan, 4-methyl dioxolan, N,N-dimethylformamide, N,N-dimethylacetamide, dimethylsulfoxide, dioxane, 1,2-dimethoxyethane, sulfolane, dichloroethane, chlorobenzene, nitrobenzene, diethylene glycol, dimethyl ether, and a combination thereof.

Non-limiting examples of the organic solid electrolyte may include a polyethylene derivative, a polyethylene oxide derivative, a polypropylene oxide derivative, a phosphoric ester polymer, a polymer, a polyvinyl alcohol, and the like.

The inorganic solid electrolyte may be, for example, $Li_3N$, LiI, $Li_5NI_2$, $Li_3N$—LiI—LiOH, $Li_2SiS_3$, $Li_4SiO_4$, $Li_4SiO_4$—LiI—LiOH, or $Li_3PO_4$—$Li_2S$—$SiS_2$.

The lithium salt may be a material easily dissolved in the non-aqueous electrolyte, for example, at least one of $LiPF_6$, $LiBF_4$, $LiSbF_6$, $LiAsF_6$, $LiClO_4$, $LiCF_3SO_3$, $Li(CF_3SO_2)_2N$, $Li(FSO_2)_2N$, $LiC_4F_9SO_3$, $LiAlO_2$, $LiAlCl_4$, $LiN(C_xF_{2x+1}SO_2)(C_yF_{2y+1}SO_2)$ (wherein x and y are natural numbers), LiCl, LiI, and mixtures thereof may be used. In addition, in consideration of improvement in charge and discharge characteristics and flame retardancy, the nonaqueous electrolyte may further include at least one selected from pyridine, triethyl phosphate, triethanolamine, cyclic ether, ethylenediamine, n-glyme, hexamethyl phosphoramide, a nitrobenzene derivative, sulfur, a quinoneimine-dye, N-substituted oxazolidinone, N,N-substituted imidazolidine, ethylene glycol dialkyl ether, ammonium, pyrrole, 2-methoxyethanol, and trichloroaluminum. In some embodiments, in consideration of incombustibility, the nonaqueous electrolyte may further include a halogen-containing solvent, such as carbon tetrachloride and/or trifluoroethylene. A concentration of a lithium salt may be in a range of about 0.1 M to about 2.0 M. When a concentration of the lithium salt is within this range, the electrolyte may have suitable or appropriate conductivity (e.g., electrical conductivity) and viscosity for improved performance, and may improve the mobility of lithium ions.

The lithium secondary battery may include a positive electrode, a negative electrode, and a separator.

The positive electrode, negative electrode, and separator may be wound or folded, and then sealed in a battery case. The battery case may then be filled with an organic electrolyte solution and hermetically sealed with a cap assembly, thereby completing the manufacture of the lithium secondary battery. The battery case may be a cylindrical type, a rectangular type, or a thin-film type.

In one or more embodiments, the separator may be between the positive electrode and the negative electrode to provide a battery assembly. The battery assembly may be stacked in a bi-cell structure and impregnated with an electrolyte solution, and put into a pouch and hermetically sealed, thereby completing the manufacture of a lithium-ion polymer battery.

In one or more embodiments, a plurality of battery assemblies may be stacked to form a battery pack, which may be used in a device that requires large capacity and high power, for example, in a laptop computer, a smartphone, or an electric vehicle.

Although the lithium secondary battery according to an embodiment is described as an example of a prismatic shape, embodiments are not limited thereto. Various suitable types of batteries such as a cylindrical shape, a pouch type, and a coin type may be used.

Figure 4:
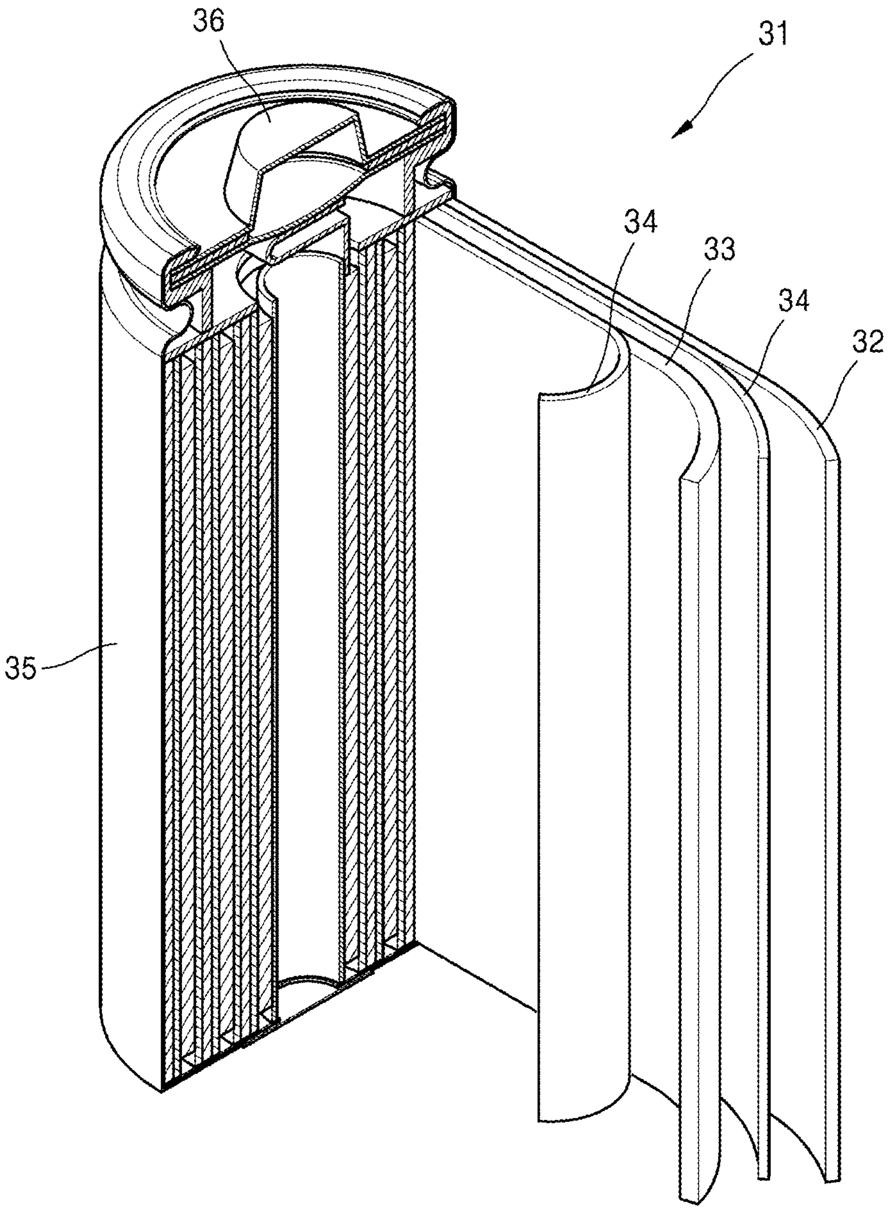
FIG. 4 is a schematic view illustrating a structure of a lithium secondary battery according to an embodiment.

FIG. 4 is a schematic view illustrating an embodiment of a representative structure of a lithium secondary battery.

As shown in FIG. 4, a lithium secondary battery 31 may include a positive electrode 33 including a composite positive electrode material according to one or more embodiments, a negative electrode 32, and a separator 34. The positive electrode 33, the negative electrode 32, and the separator 34 may be wound or folded to form an electrode assembly. Then, the electrode assembly may be sealed in a battery case 35. Depending on a shape of a battery, the separator may be between the positive electrode and the negative electrode to provide a battery assembly in which the positive electrode and the negative electrode are alternately stacked. The battery case 35 may then be filled with an organic electrolyte solution and hermetically sealed with a cap assembly 86, thereby completing the manufacture of the lithium secondary battery 31. The battery case 35 may be a cylindrical type, a rectangular type, or a thin-film type. For example, the lithium secondary battery 31 may be a large thin-film type battery. The lithium secondary battery may be a lithium-ion polymer battery. The battery assembly may be put into a pouch and impregnated with an electrolyte solution, and then the battery assembly may be sealed, thereby completing the manufacture of a lithium-ion polymer battery. In one or more embodiments, a plurality of battery assemblies may be stacked to form a battery pack, which may be used in a device that requires large capacity and high power. For example, the battery pack may be used in a laptop computer, a smart phone, and/or an electric vehicle.

Hereinafter example embodiments will be described in more detail with reference to Examples and Comparative Examples. These examples are provided for illustrative purposes only and are not intended to limit the scope of the present disclosure.

Preparation of Composite Positive Active Material

Example 1: LCO Doped with Mg 1,000 ppm and Al 6,000 ppm+Surface Coating of Ti 700 ppm/Zr 4,500 ppm Lithium carbonate, $Co_3O_4$ (D50: 4.5 μm), aluminum hydroxide $Al(OH)_3$, and magnesium carbonate ($MgCO_3$) as a magnesium precursor were mixed together to obtain a first mixture of $Li_{1.04}Mg_{0.005}Co_{0.978}Al_{0.022}O_2$ by stoichiometrically controlling the mixing molar ratio of the precursors. The first mixture was heated at a heat increase rate of 4.5° C./min to 1,088° C., followed by primary heat-treating for 15 hours at the temperature in an air atmosphere, thereby preparing large particles $Li_{1.04}Mg_{0.005}Co_{0.978}Al_{0.022}O_2$, having a layered structure and an average particle diameter (D50) of about 17 μm.

$Co_3O_4$ (D50: 2.5 μm) as a cobalt precursor, aluminum hydroxide $Al(OH)_3$, lithium carbonate, and magnesium carbonate as a magnesium precursor were mixed together at a Li:Co:Mg:Al molar ratio of 1.04:0.9733:0.0050:0.0217 to thereby obtain a second mixture. The second mixture was heated at a heat increase rate of 4.5° C./min to 940° C., followed by heat-treating for 5 hours at the temperature, thereby obtaining small particles (D50: 3.5 μm) $Li_{1.04}Mg_{0.005}Co_{0.978}Al_{0.022}O_2$, having a layered-structure.

The thus obtained large particles and small particles were mixed together at a weight ratio of 8:2, and titanium oxide and cobalt hydroxide ($Co(OH)_2$) (having an average particle diameter of about 100 nm) were added thereto to thereby obtain a third mixture. The third mixture was heated to a temperature of about 950° C. The content of cobalt hydroxide was 5 parts by weight, based on 100 parts by weight of large particles or small particles, and the content of titanium oxide was stoichiometrically controlled such that a content of titanium was about 700 ppm in the composite positive active material.

The thus heat-treated product was added with zirconium oxide to obtain a fourth mixture, and the fourth mixture was heat-treated again at a temperature of about 1,000° C. to thereby obtain a composite positive active material. The content of zirconium oxide was stoichiometrically controlled such that a content of zirconium was about 4500 ppm in the composite positive active material.

The composite positive active material had a bimodal state of containing large particles of $Li_{1.04}Mg_{0.005}Co_{0.978}Al_{0.022}O_2$ (D50: 17 μm) and small particles of $Li_{1.04}Mg_{0.005}Co_{0.978}Al_{0.022}O_2$ (D50: 3.5 μm). The large particles and the small particles each had a structure in which the first coating layer was on the first surface, the second coating layer was on the first coating layer, the third coating layer was in the second inner portion of the composite positive active material, and a lithium-deficient cobalt phase ($Li_{0.8}Mg_{0.007}CoO_2$) was included in the first inner portion in contact with the first coating layer. The first coating layer contained $Li_2Ti_{0.97}Co_{0.02}Mg_{0.01}O_3$, the second coating layer contained $Li_2Zr_{0.98}Co_{0.02}O_3$, and the third coating layer contained $LiCo_2O_4$. In the structure of the composite positive active material, the first inner portion in contact with the first coating layer of the composite positive active material included a first lithium zirconium-based oxide of $Li_2Zr_{0.95}Co_{0.05}O_3$.

Example 2: LCO Doped with Mg 1,000 ppm and Al 6,000 ppm+Surface Coating of Ti 700 ppm/Zr 6,750 ppm The thus obtained large particles and small particles in Example 1 were mixed together at a weight ratio of 8:2, and titanium oxide and cobalt hydroxide ($Co(OH)_2$) (having an average particle diameter of about 100 nm) were added thereto to thereby obtain a third mixture. The third mixture was heated to a temperature of about 950° C. The content of cobalt hydroxide was 5 parts by weight, based on 100 parts by weight of large particles or small particles, and the content of titanium oxide was stoichiometrically controlled such that a content of titanium was about 700 ppm in the composite positive active material.

The thus heat-treated product was added with zirconium oxide to obtain a fourth mixture, and the fourth mixture was heat-treated again at a temperature of about 1,000° C. to thereby obtain a composite positive active material. The content of zirconium oxide was stoichiometrically controlled such that a content of zirconium was about 6750 ppm in the composite positive active material.

Example 3

The composite positive active material was prepared in substantially the same manner as in Example 1, except that the weight ratio of large particles to small particles was changed from 8:2 to 7:3.

Comparative Example 1: LCO Doped with Mg 1,000 ppm and Al 4,000 ppm

The large and small positive active material were prepared in substantially the same manner as in Example 1, except that upon preparation of the first mixture and the second mixture, a mixing molar ratio of lithium carbonate, $Co_3O_4$, and $MgCO_3$ as a magnesium precursor were stoichiometrically controlled to obtain $LiMg_{0.005}Co_{0.985}Al_{0.015}$.

The thus obtained large particles and small particles were mixed together at a weight ratio of 8:2, and cobalt hydroxide ($Co(OH)_2$) was added thereto to thereby obtain a third mixture. The third mixture was secondary heat-treated to a temperature of about 900° C. to thereby obtain a bimodal composite positive active material containing large particles of $LiMg_{0.005}Co_{0.985}Al_{0.015}$ (D50: 17 μm) and small particles of $LiCo_{0.9805}Al_{0.0145}Mg_{0.005}O_2$ (D50: 3.5 μm).

Comparative Example 2: LCO Doped with Mg 1,000 ppm and Al 4,000 ppm+Surface Coating of Ti 700 ppm The thus obtained large particles and small particles in Example 1 were mixed together at a weight ratio of 8:2, and titanium oxide and cobalt hydroxide ($Co(OH)_2$) were added thereto to thereby obtain a third mixture. The bimodal composite positive active material was prepared in substantially the same manner as in Example 1, except that the third mixture was heat-treated to about 950° C., addition of zirconium oxide and heat-treatment were not performed on the heat-treated product.

Preparation of Lithium Secondary Battery

Manufacture Example 1

A mixture of the positive active material obtained according to Example 1, polyvinylidene fluoride, and carbon black as a conductive agent was subjected to mixing by using a mixer to remove air bubbles to prepare a uniformly dispersed slurry for forming a positive active material layer. N-methyl 2-pyrrolidone as a solvent was added to the mixture, and the mixing weight ratio of the composite positive active material, polyvinylidene fluoride, and carbon black was 98:1:1 by weight. The slurry for forming a positive electrode active material layer was coated onto an aluminum foil using a doctor blade to form a thin plate. The thin plate was dried at 135° C. for 3 hours or more, pressed, and dried in vacuum to prepare a positive electrode.

A negative electrode was prepared by mixing natural graphite, carboxymethylcellulose (CMC), and styrene butadiene rubber (SBR) to obtain a composition for forming a negative active material, coating the mixture on a copper current collector, and drying the coated mixture to prepare a negative electrode. The weight ratio of natural graphite, CMC, and SBR was 97.5:1:1.5, and the content of distilled water was about 50 parts by weight, based on 100 parts by weight of natural graphite, CMC, and SBR.

A separator formed of a porous polyethylene (PE) film and having a thickness of about 10 μm was between the positive electrode and the lithium electrode, and an electrolyte was injected thereto to prepare a lithium secondary battery. The electrolyte was a solution of 1.1 M $LiPF_6$ dissolved in a mixed solvent of ethylene carbonate (EC), ethyl methyl carbonate (EMC), and dimethyl carbonate (DMC) in a volume ratio of 3:4:3.

Manufacture Example 2

A lithium secondary battery was manufactured in substantially the same manner as in Manufacture Example 1, except that the composite positive active material of Example 2 was used instead of the composite positive active material of Example 1 to prepare a positive electrode.

Comparative Manufacture Examples 1 to 2

Lithium secondary batteries were manufactured in substantially the same manner as in Manufacture Example 1, except that the composite positive active materials of Comparative Examples 1 to 2 were respectively used instead of the composite positive active material of Example 1 to prepare a positive electrode.

Evaluation Example 1: High-Resolution Scanning Transmission Electron Microscopy Equipped with a High Angular Annular Dark Field Detector (HR STEM HAADF) Analysis (I)

Figure 2A:
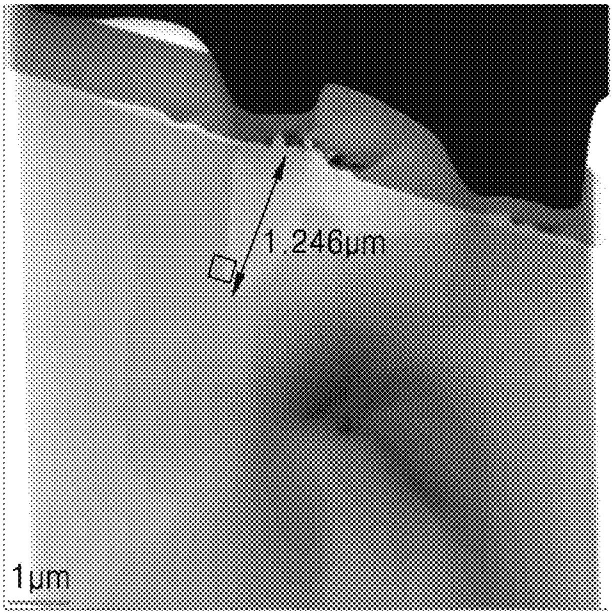
FIGS. 2A-2B are each a high-resolution transmission electron microscopy (HR-TEM) analysis image of a composite positive active material prepared in Example 1.
Figure 2B:
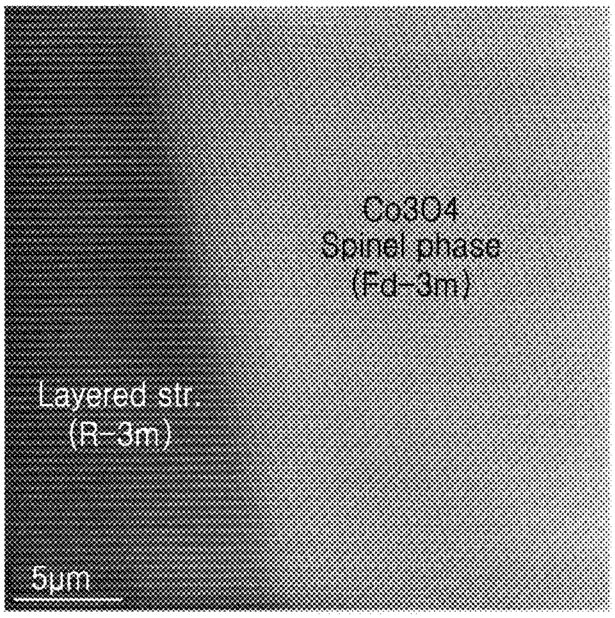

The composite positive active material of Example 1 was subjected to HR STEM HAADF analysis. The analysis results thereof are shown in FIGS. 2A-2B. FIG. 2B is an enlarged view of a portion in FIG. 2A.

In the composite positive active material of Example 1, as shown in FIG. 2A, a lithium-deficient cobalt oxide phase having a spinel phase up to 1.246 μm was observed on the first surface of the first inner portion of the lithium cobalt-based oxide, and the first lithium zirconium-based oxide having a R-3m rhombohedral layered-structure was formed under the lithium-deficient cobalt oxide phase.

Evaluation Example 2: Charge/Discharge Characteristics

The lithium secondary batteries manufactured in Manufacture Examples 1 to 2 and Comparative Manufacture Examples 1 to 2 were charged with a constant current at a temperature of 25° C. until SOC 90%, followed by 48 hours of aging. Then, the voltage of 4.58 V was maintained at a constant current/constant voltage mode, followed by cut-off at a current of 0.05 C rate. Afterward, the lithium secondary batteries were discharged with a constant current of 0.5 C rate until the voltage reached 3.0 V.

The lithium secondary batteries that had undergone the formation process were charged with a constant current of 0.2 C until the voltage reached 4.55 V. After charging was completed, each cell was subjected to a rest period of about 10 minutes, and then subjected to constant current discharge at a current of 0.2 C until the voltage reached 3 V.

The initial charge/discharge efficiency was evaluated according to Equation 1. The evaluation results of charge/discharge are shown in Table 1.

$$\text{Initial charge/discharge efficiency } (\%\_ = (1 \text{ cycle of discharge capacity } (0.2\text{ C.})/1 \text{ cycle of charge capacity } (0.2\text{ C.})) \times 100 \quad \text{Equation 1}$$

Evaluation Example 3: HR STEM HAADF Analysis (II)

The lithium secondary battery manufactured in Manufacture Example 1 was charged with a constant current at a temperature of 25° C. until SOC 90%, followed by 48 hours of aging. Then, the voltage of 4.58 V was maintained at a constant current/constant voltage mode, followed by cut-off at a current of 0.05 C rate. Afterward, the lithium secondary battery was discharged with a constant current of 0.5 C rate until the voltage reached 3.0 V.

The lithium secondary battery that had undergone the $1^{st}$ cycle of the formation process was charged at a temperature of 25° C. with a constant current of 0.2 C until the voltage reached 4.55 V. After charging was completed, the lithium secondary battery was subjected to a rest period of about 10 minutes, and then subjected to constant current discharge at a current of 0.2 C until the voltage reached 3 V. This cycle of charging and discharging was repeated 50 times.

As described above, after performing 50 cycles of charging and discharging, the composite positive active material of Example 1 was subjected to HR STEM HAADF analysis.

As the analysis results, in the composite positive active material of Example 1, a portion in which the first lithium zirconium-based oxide exists was found to maintain the layered-structure (R-3m). Accordingly, it was found that the structural stability of the composite positive active material of Example 1 was excellent even after repeated charging and discharging.

Evaluation Example 4: Lifespan at High Temperature

The lithium secondary batteries manufactured in Manufacture Examples 1 to 2 and Comparative Manufacture Examples 1 to 2 were charged with a constant current at a temperature of 25° C. until SOC 90%, followed by 48 hours of aging. Then, the voltage of 4.58 V was maintained at a constant current/constant voltage mode, followed by cut-off at a current of 0.05 C rate. Afterward, the lithium secondary battery was discharged with a constant current of 0.5 C rate until the voltage reached 3.0 V ($1^{st}$ cycle of the formation process).

The lithium secondary battery that had undergone the $1^{st}$ cycle of the formation process was charged at a temperature of 45° C. with a constant current of 0.2 C until the voltage reached 4.55 V. After charging was completed, the lithium secondary battery was subjected to a rest period of about 10 minutes, and then subjected to constant current discharge at a current of 0.2 C until the voltage reached 3 V. This cycle of charging and discharging was repeated 50 times.

The lifespan at a high temperature was evaluated according to Equation 2. The evaluation results of charge/discharge are shown in Table 1.

$$\text{Lifespan (\%)} = (\text{50 cycles of discharge capacity}/\text{1 cycle of discharge capacity}) \times 100 \qquad \text{Equation 2}$$

Evaluation Example 5: Direct Current Internal Resistance (DC-IR) Test

The lithium secondary batteries manufactured in Manufacture Examples 1 to 2 and Comparative Manufacture Examples 1 to 2 were charged with a constant current at a temperature of 25° C. until SOC 90%, followed by 48 hours of aging. Then, the voltage of 4.58 V was maintained at a constant current/constant voltage mode, followed by cut-off at a current of 0.05 C rate. Afterward, the lithium secondary battery was discharged with a constant current of 0.5 C rate until the voltage reached 3.0 V.

The lithium secondary batteries that had undergone the formation process were charged with a constant current of 0.2 C until the voltage reached 4.55 V. After charging was completed, each cell was subjected to a rest period of about 10 minutes, and then subjected to constant current discharge at a current of 0.2 C until the voltage reached 3 V.

The DCIR of each of the lithium secondary batteries was measured. The results thereof are shown in Table 1.

TABLE 1

| Coin-cell | Manufacture Example 1 | Manufacture Example 2 | Comparative Manufacture Example 1 | Comparative Manufacture Example 2 |
|---|---|---|---|---|
| 0.2 C charge capacity (mAh) | 208.0 | 207.5 | 209.4 | 209.5 |
| 0.2 C discharge capacity (mAh) | 192.4 | 192.0 | 195.8 | 195.7 |
| 0.2 C charge/discharge efficiency (%) | 92.5 | 92.5 | 93.5 | 93.4 |
| DC-IR (mΩ) | 10.5 | 10.5 | 18.3 | 13.2 |
| Lifespan (%) at high temperature (at $50^{th}$ cycle) | 71.2 | 71.2 | 52.6 | 47.5 |

As shown in Table 1, the lithium secondary batteries of Manufacture Examples 1 and 2 were found to have improved lifespan at a high temperature and improved resistance characteristics, as compared with the lithium secondary batteries of Comparative Manufacture Examples 1 and 2.

Evaluation Example 6: TEM-EDS Analysis (I)

Figure 3A:
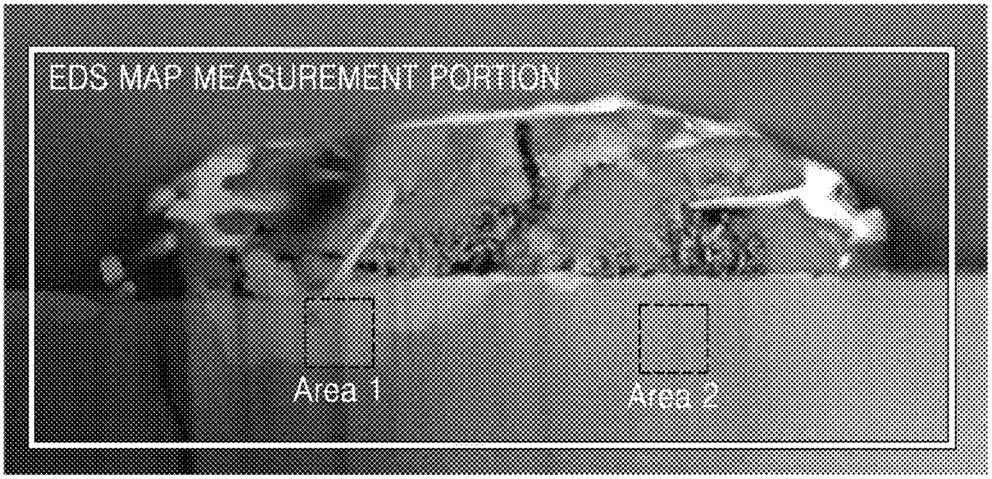
FIGS. 3A to 3H show results of scanning electron microscopy energy dispersive X-ray spectroscopy (SEM-EDS) analysis of the composite positive active material prepared in Example 1.
Figure 3B:
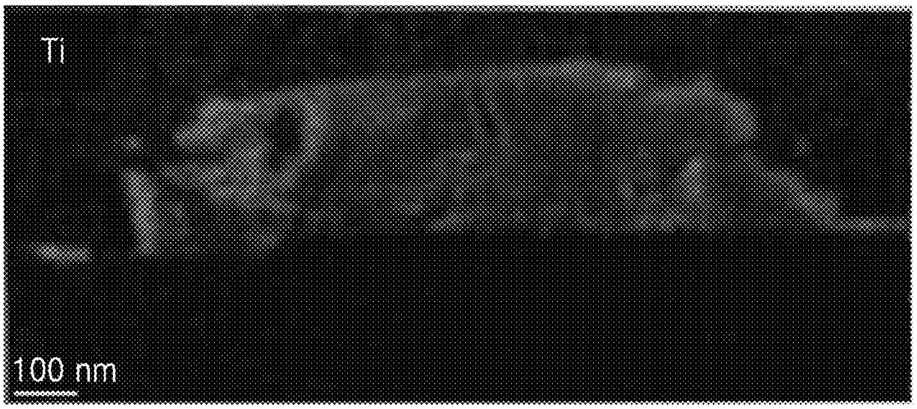

The composite positive active material of Example 1 was subjected to TEM-energy dispersive X-ray spectroscopy (EDS) analysis. The analysis results are shown in FIGS. 3A to 3H. FIG. 3A shows an EDS MAP measurement portion. Area 1 in FIG. 3A is a lithium-deficient cobalt phase portion, and Area 2 in FIG. 3A is a surface coating portion. FIGS. 3B, 3C, 3D, 3E, and 3F respectively show mapping images of Ti, Mg, O, Co, and Zr. FIGS. 3G and 3H respectively show the EDS analysis results of Areas 1 and 2 in FIG. 3A.

Figure 3C:
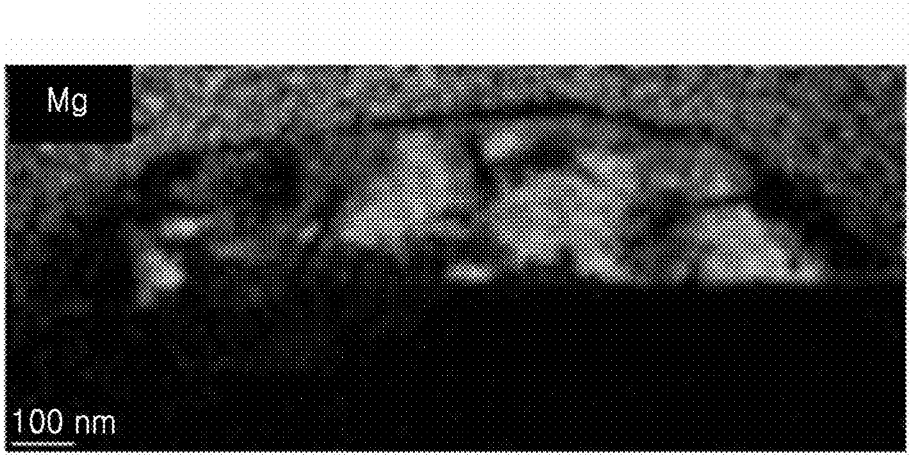
Figure 3D:
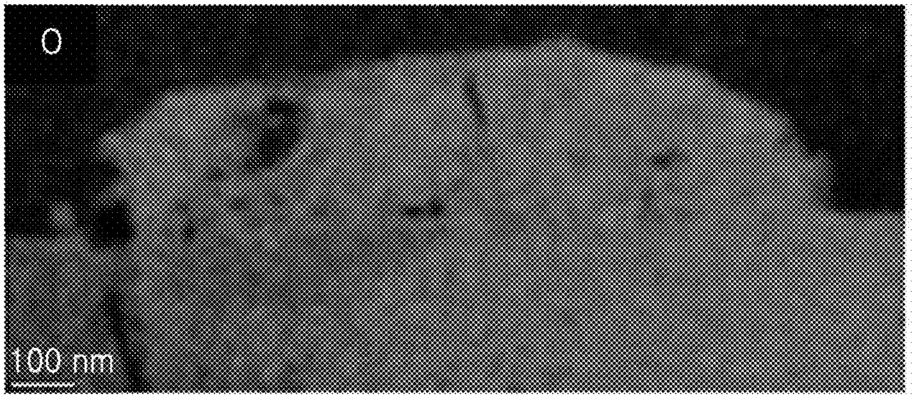
Figure 3E:
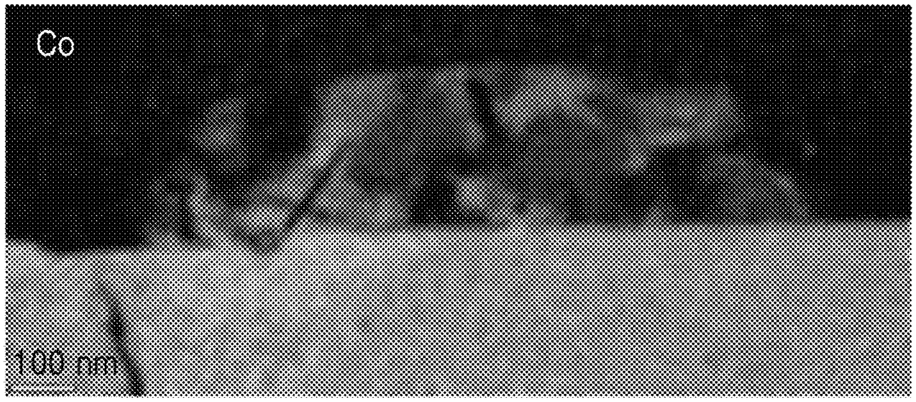
Figure 3F:
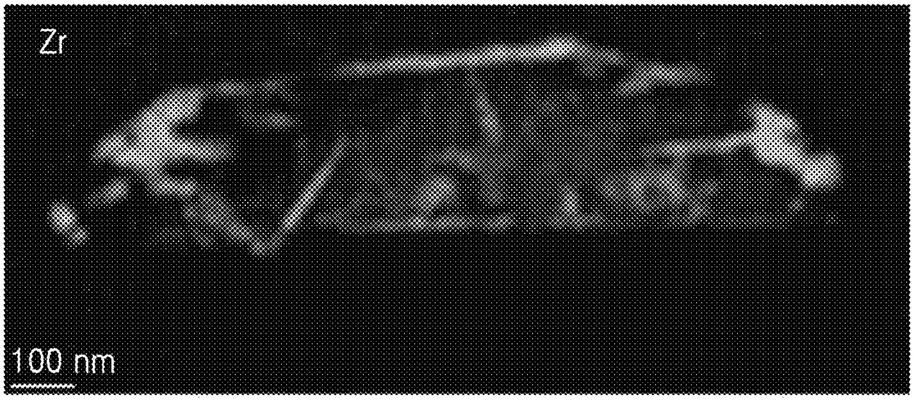
Figure 3G:
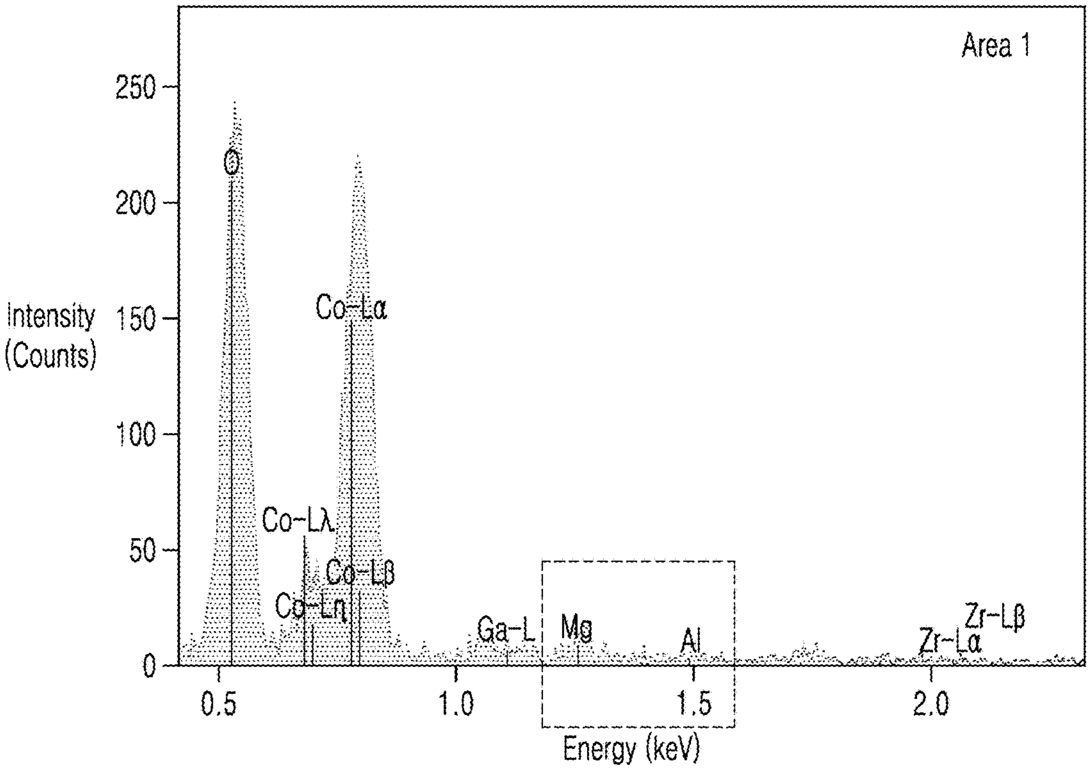
Figure 3H:
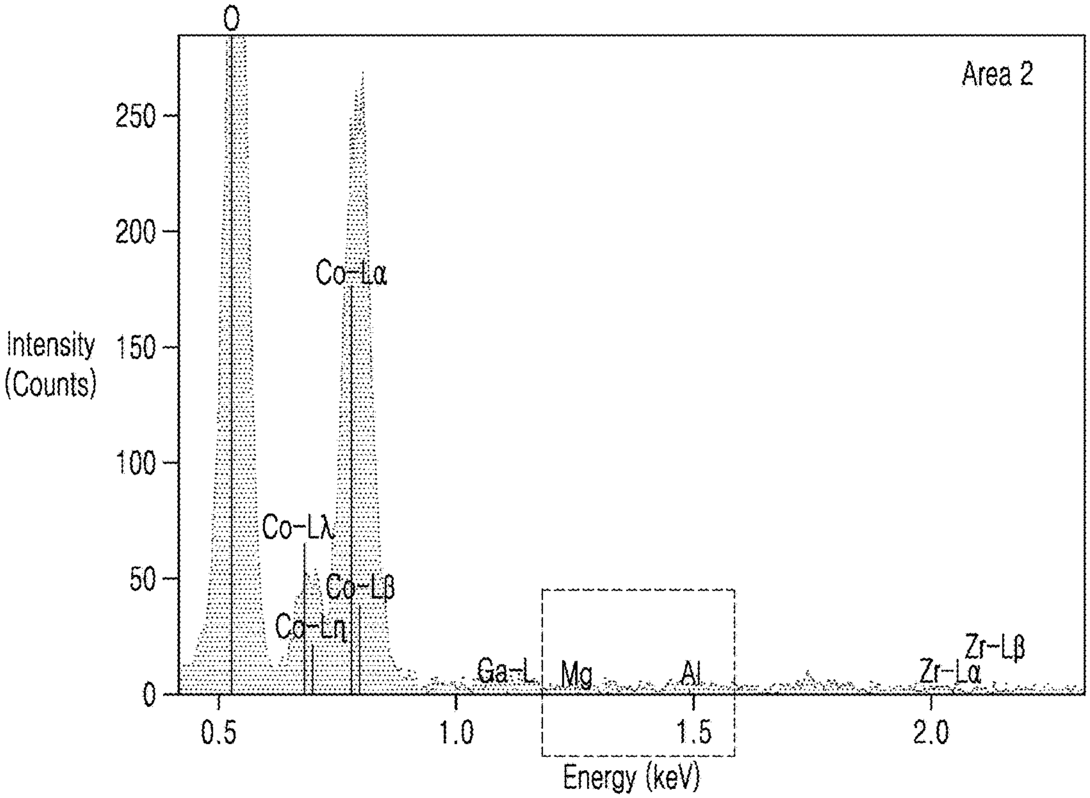

As shown in the figures, the Co components were present evenly in the lithium cobalt-based oxide portion (the core portion) and the particle coating portion of the composite positive active material (FIG. 3E), and the Mg components were present in the particle coating portion (FIG. 3C). The Zr components are present in the particle coating portion (FIG. 3F), and the oxygen (O) components were evenly distributed in the core portion and particle coating portion as shown in FIG. 3D. Accordingly, Mg, Ti, Zr, and Co were observed in a mixed form inside the lithium cobalt-based oxide, and it was found that the distribution of each element was slightly different. As shown in FIGS. 3G and 3H, Area 1 is a portion in which Co and Mg are rich, and O and Al are poor, as compared with Area 2.

Evaluation Example 7: SEM-Energy Dispersive X-Ray Spectroscopy (EDS) Analysis

The SEM-EDS analysis was performed on the composite positive active material prepared in Example 1. A Spectra 300 (available from Thermo Fisher) was used for the SEM-EDS analysis.

The results of the SEM-EDS analysis are shown in FIGS. 5 and 6A to 6F.

Figure 5:
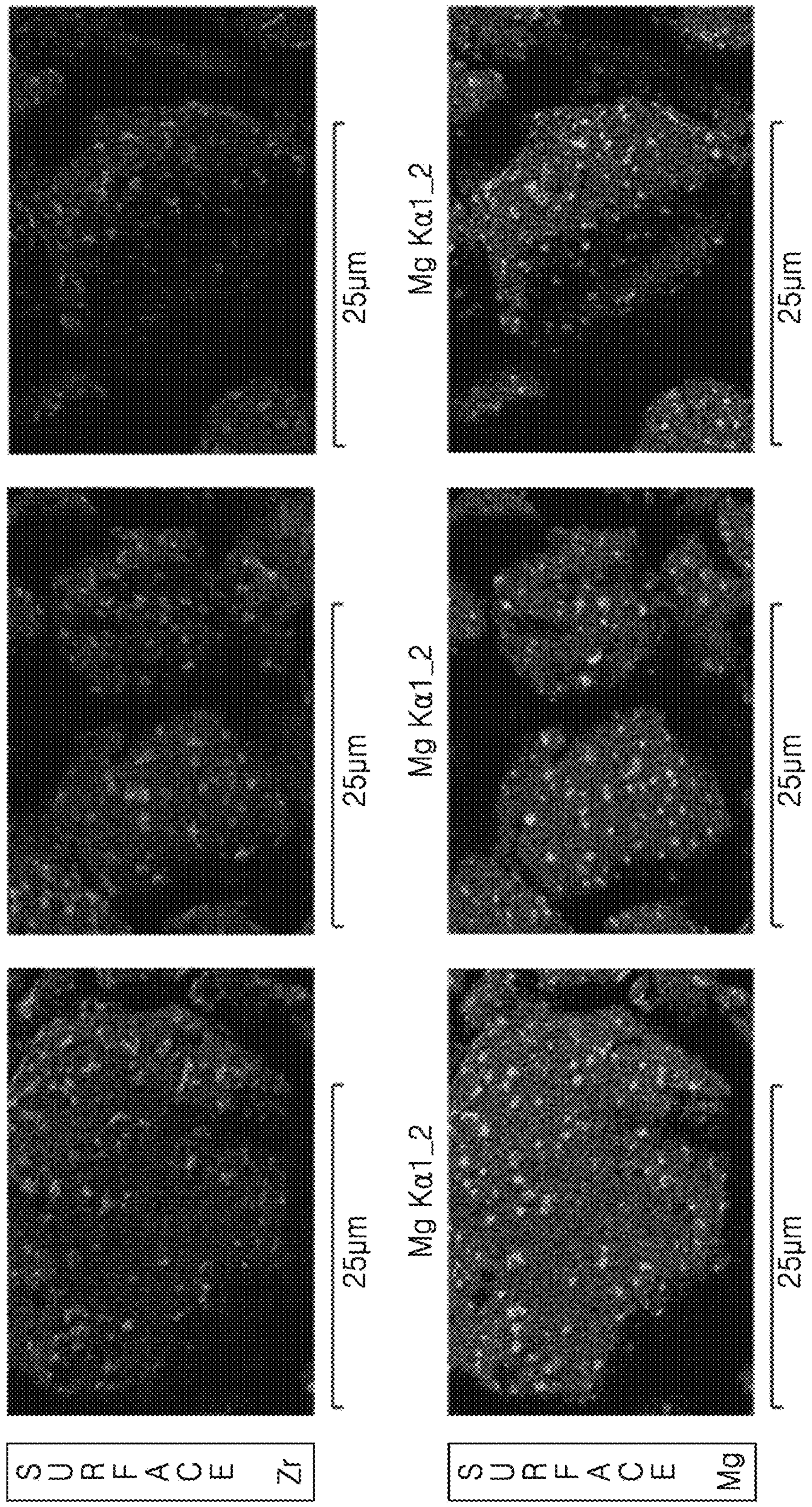
FIGS. 5 and 6A to 6F show results of SEM-EDS analysis of the composite positive active material prepared in Example 1.
Figure 6A:
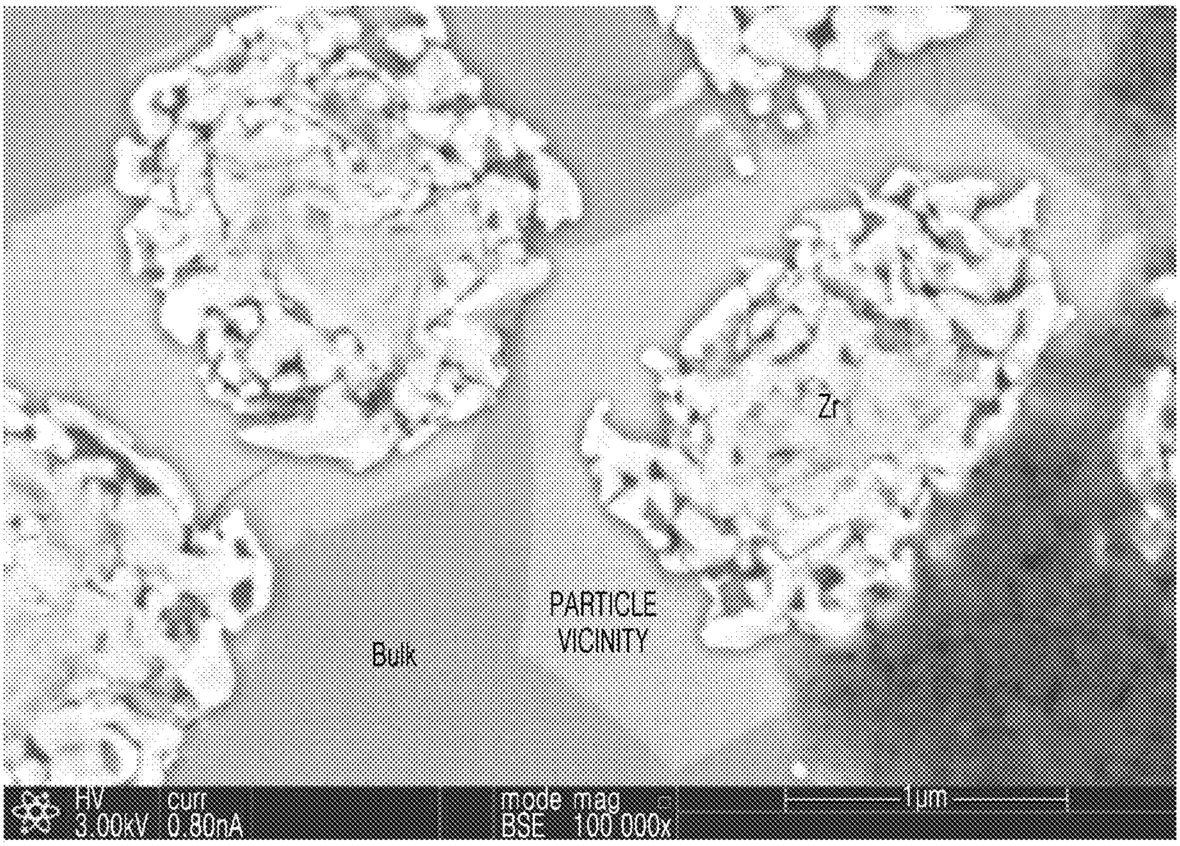
Figure 6B:
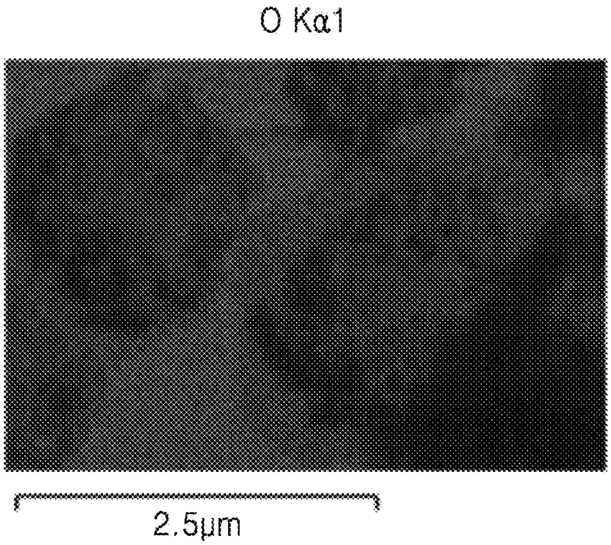
Figure 6C:
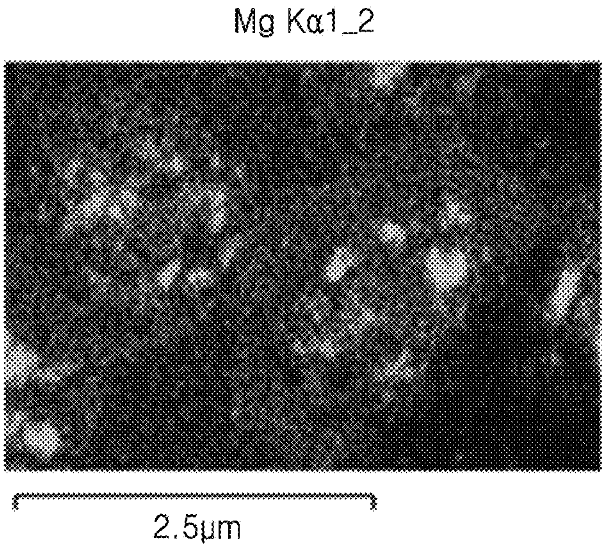
Figure 6D:
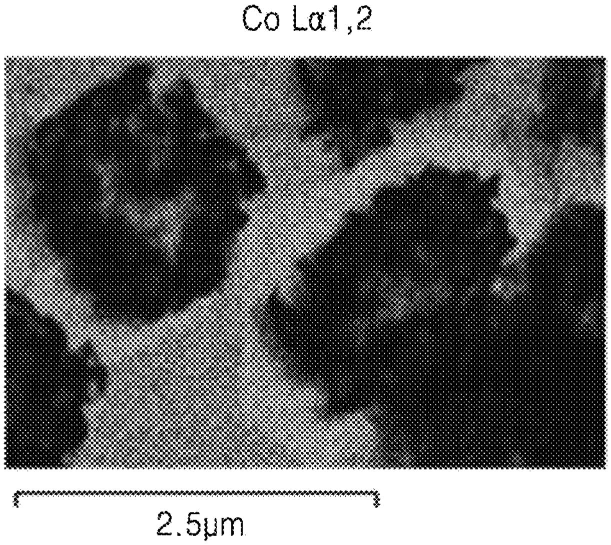
Figure 6E:
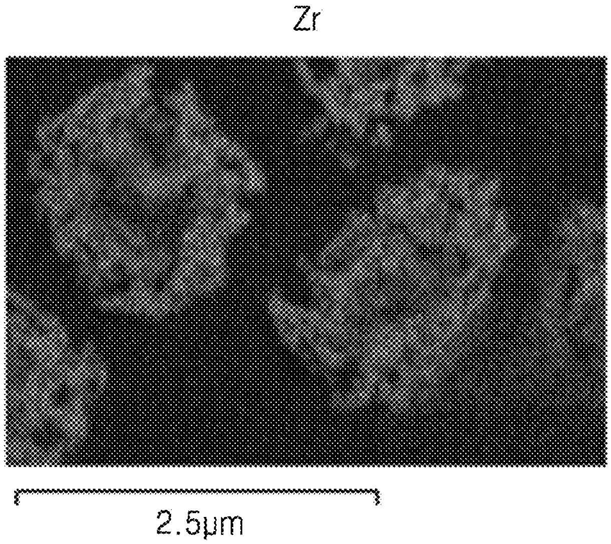
Figure 6F:
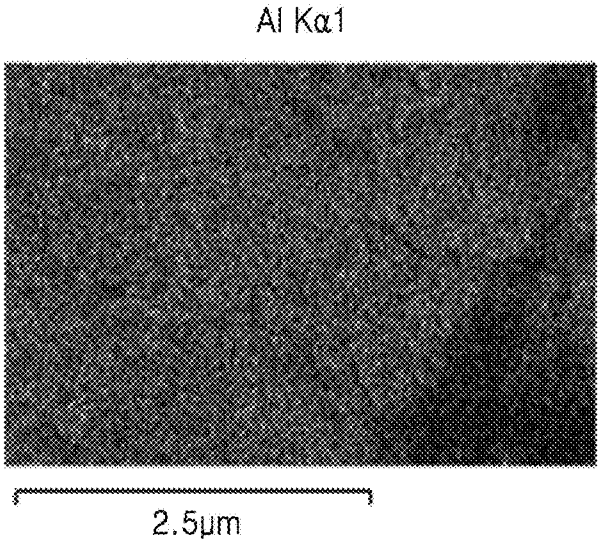

As shown in FIG. 5, it was found that magnesium was present evenly on the surface of the composite positive active material of Example 1, and zirconium was present on the particle coating portion.

As shown in FIGS. 6A to 6F, Zr was observed in the particle coating portion of the composite positive active material of Example 1. It was found that the content of cobalt and magnesium was high, and the content of oxygen was low in the particle coating portion of the composite positive active material of Example 1.

Evaluation Example 8: SEM and TEM Analysis

The composite positive active material of Example 1 was subjected to SEM and TEM analysis.

Figure 7A:
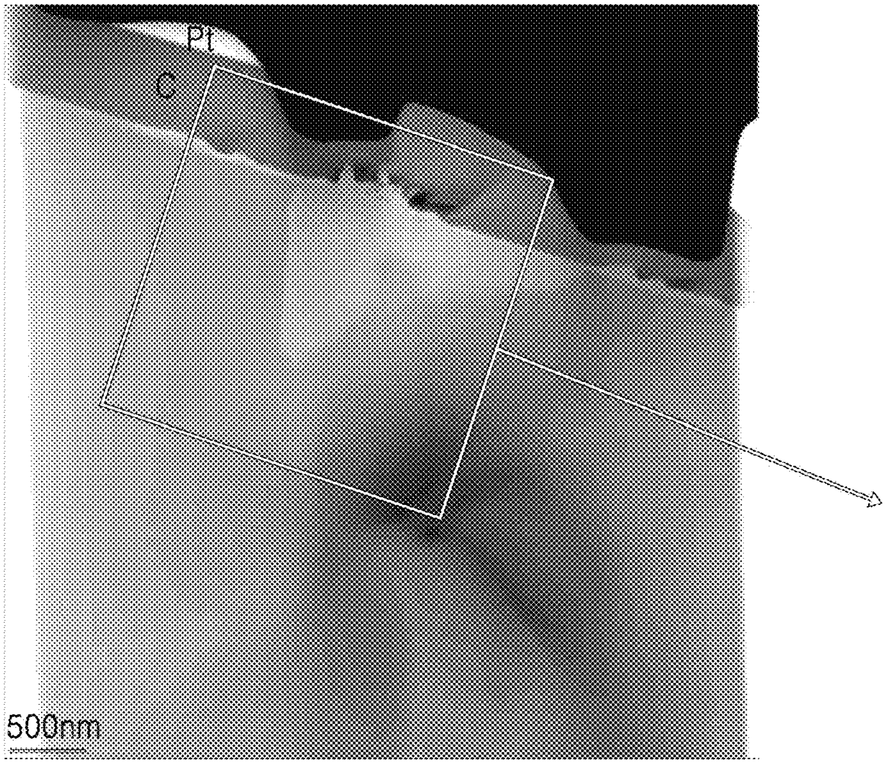
FIGS. 7A-7B and 7D are each a TEM analysis image of the composite positive active material of Example 1.
Figure 7B:
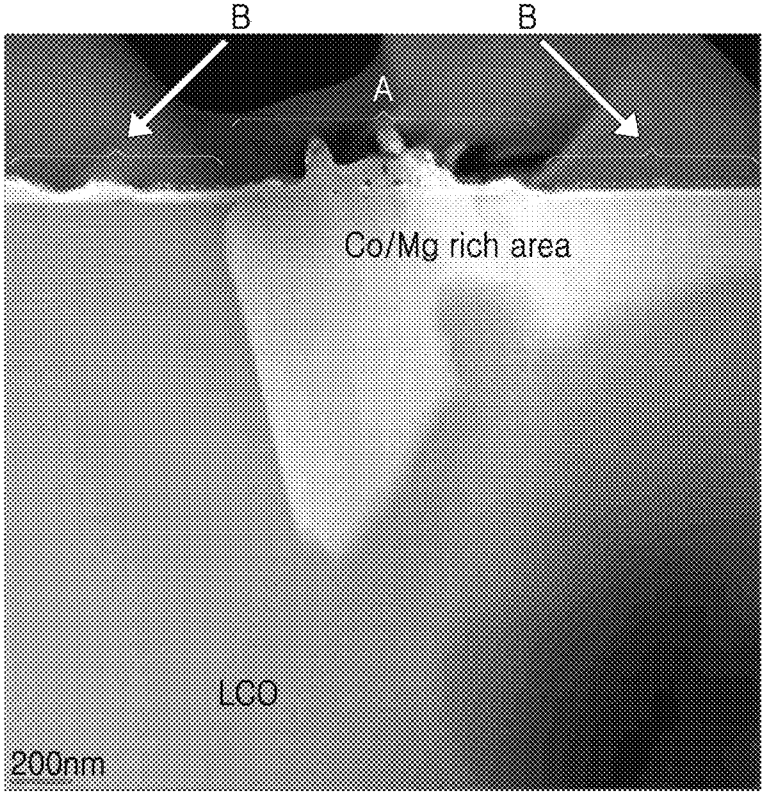
Figure 7C:
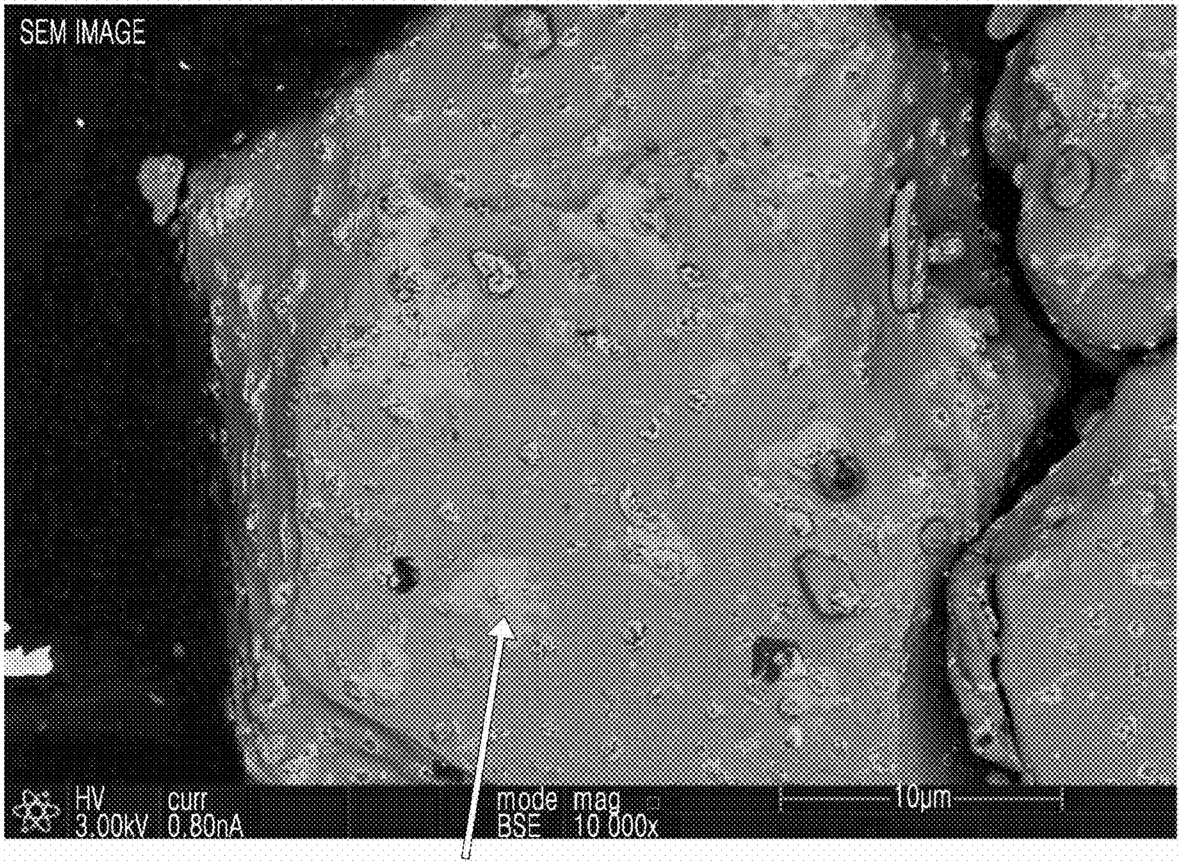
FIG. 7C is an SEM analysis image of the composite positive active material of Example 1.

FIGS. 7A-7B show the TEM analysis results. FIG. 7B is an enlarged view of the lithium-deficient cobalt oxide phase portion in FIG. 7A. FIG. 7C shows the SEM analysis. The portion indicated by an arrow is a cobalt/magnesium-rich portion, for example, a lithium-deficient cobalt oxide phase portion. The doping depth, the particle coating portion, and the surface coating portion are shown in FIG. 7B.

Figure 7D:
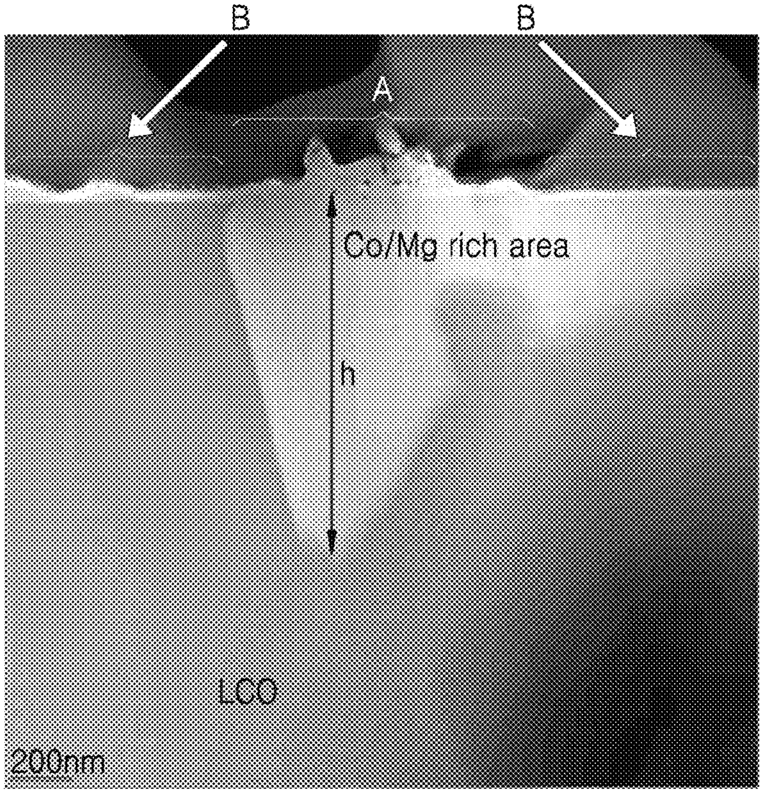

As shown in FIG. 7B, the lithium-deficient cobalt oxide phase portion was a cobalt/magnesium-rich portion. The doping depth h of the lithium-deficient cobalt oxide phase in FIG. 7B was 1 μm or less, as shown in FIG. 7D. Portion A is a particle coating portion, and Portion B is a surface coating portion.

Figure 8A:
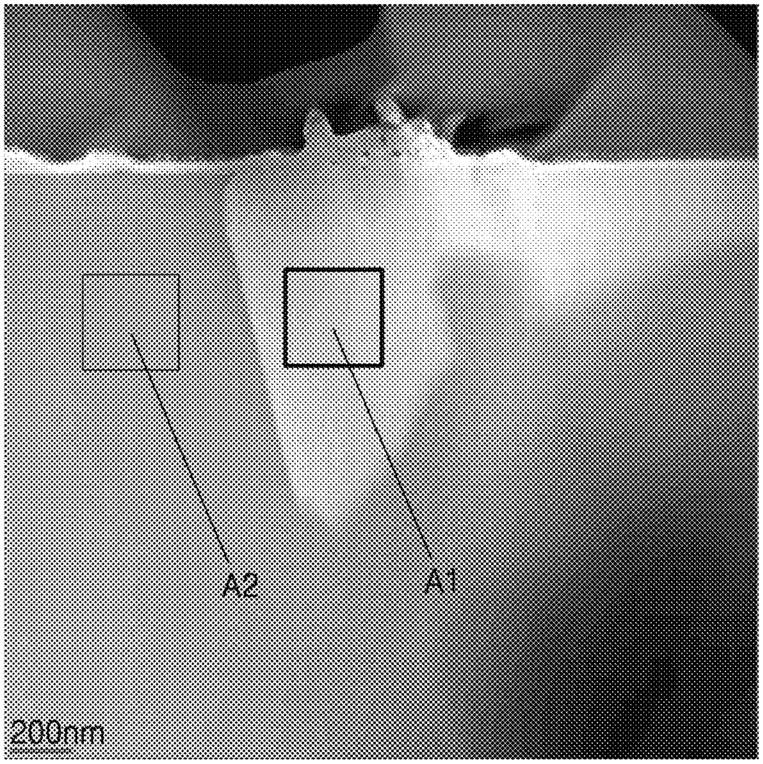
FIG. 8A is a TEM analysis image of the composite positive active material of Example 1.
Figure 8B:
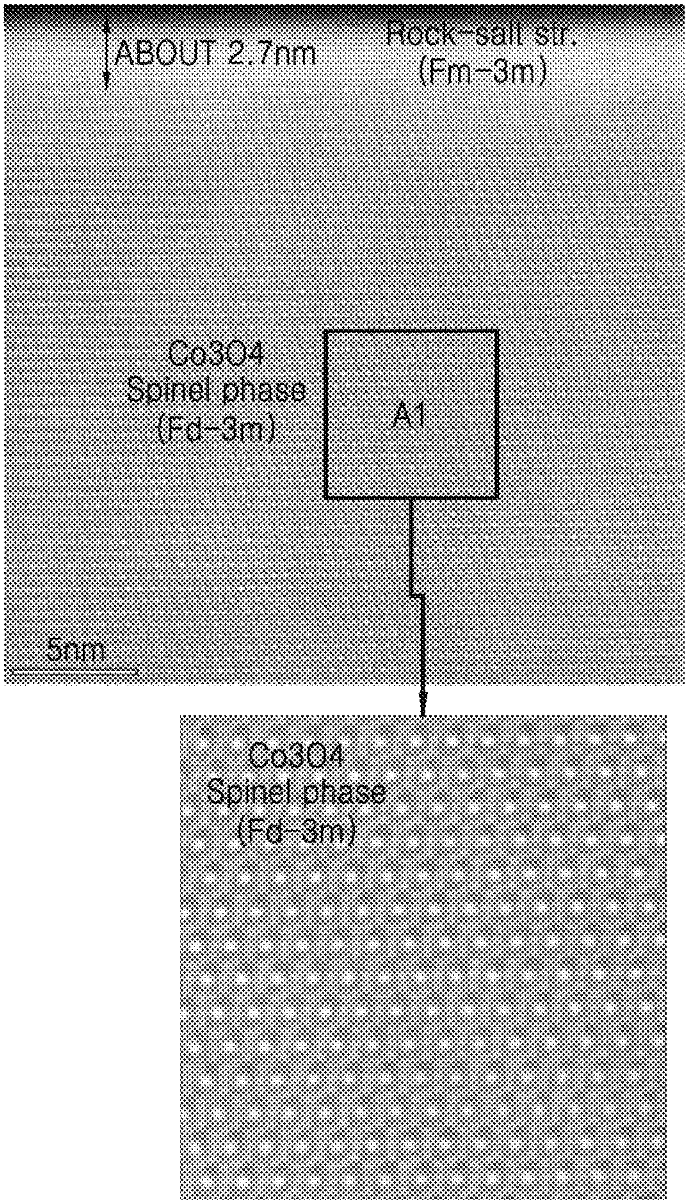
FIG. 8B is a TEM image of Portion A1 of a lithium-deficient cobalt oxide phase of FIG. 8A.

FIG. 8A is a TEM analysis image showing the crystalline structure of the composite positive active material of Example 1. FIG. 8B shows the TEM image of Portion A1 in FIG. 8A, and FIG. 8C shows the crystalline structure of Portion A2 in FIG. 8A.

Figure 8C:
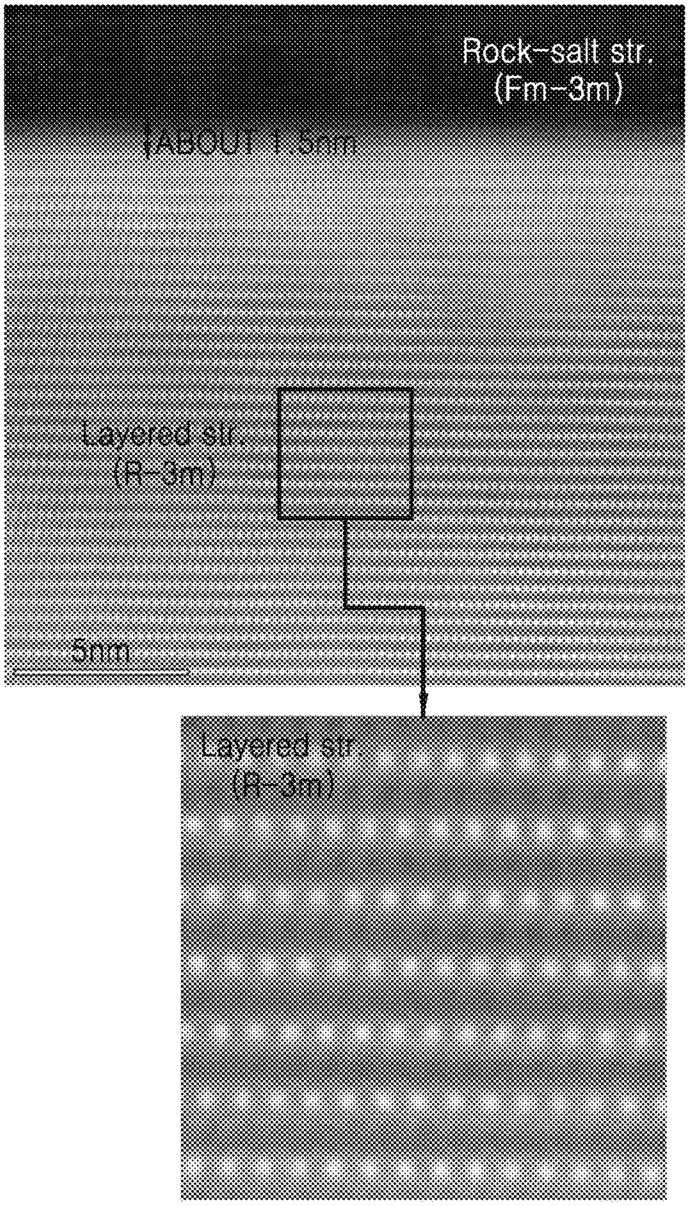
FIG. 8C is a TEM image of Portion A2 of a surface coating portion of FIG. 8A.

As shown in FIGS. 8B-8C, the lithium-deficient cobalt oxide present inside the composite positive active material particle had a spinel crystalline structure of space group Fd-3m, and the lithium cobalt-based oxide present inside the composite positive active material particle had a layered-crystalline structure of space group R3m.

Evaluation Example 9: Evaluation of Electrical Conductivity

Figure 9A:
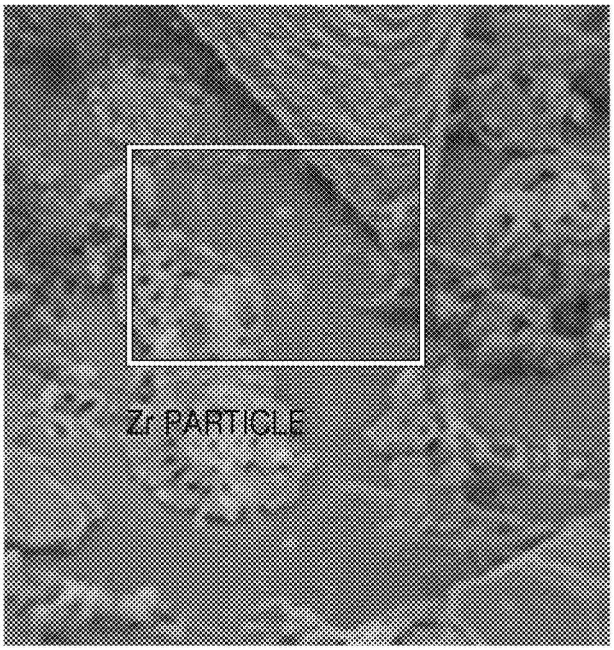
FIGS. 9A to 9E show analysis results of evaluating electrical conductivity of a bulk portion, a particle coating portion, and a surface coating portion of the composite positive active material of Example 1.
Figure 9B:
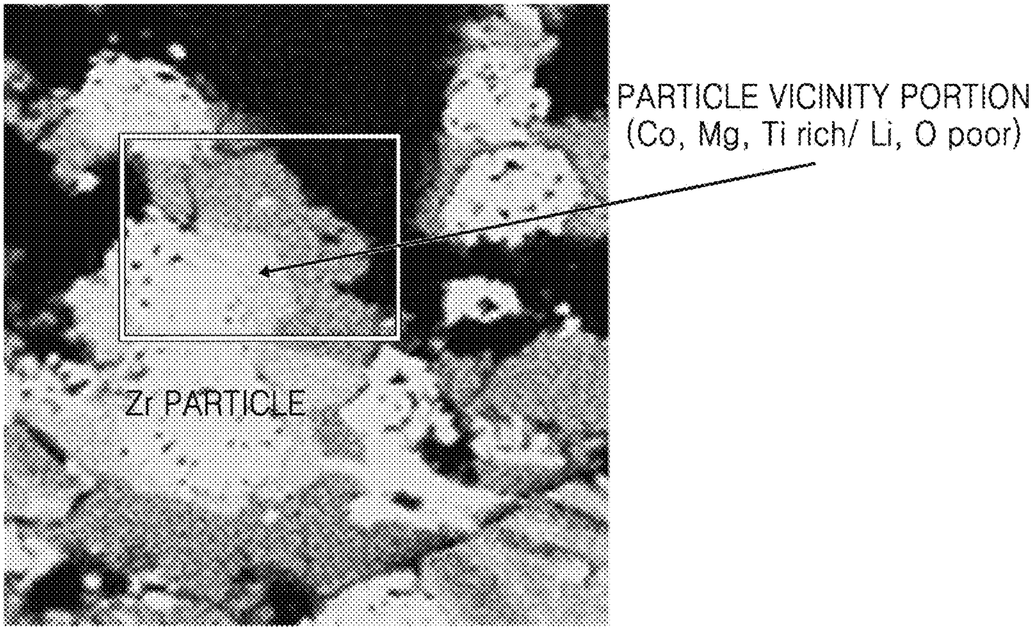
Figure 9C:
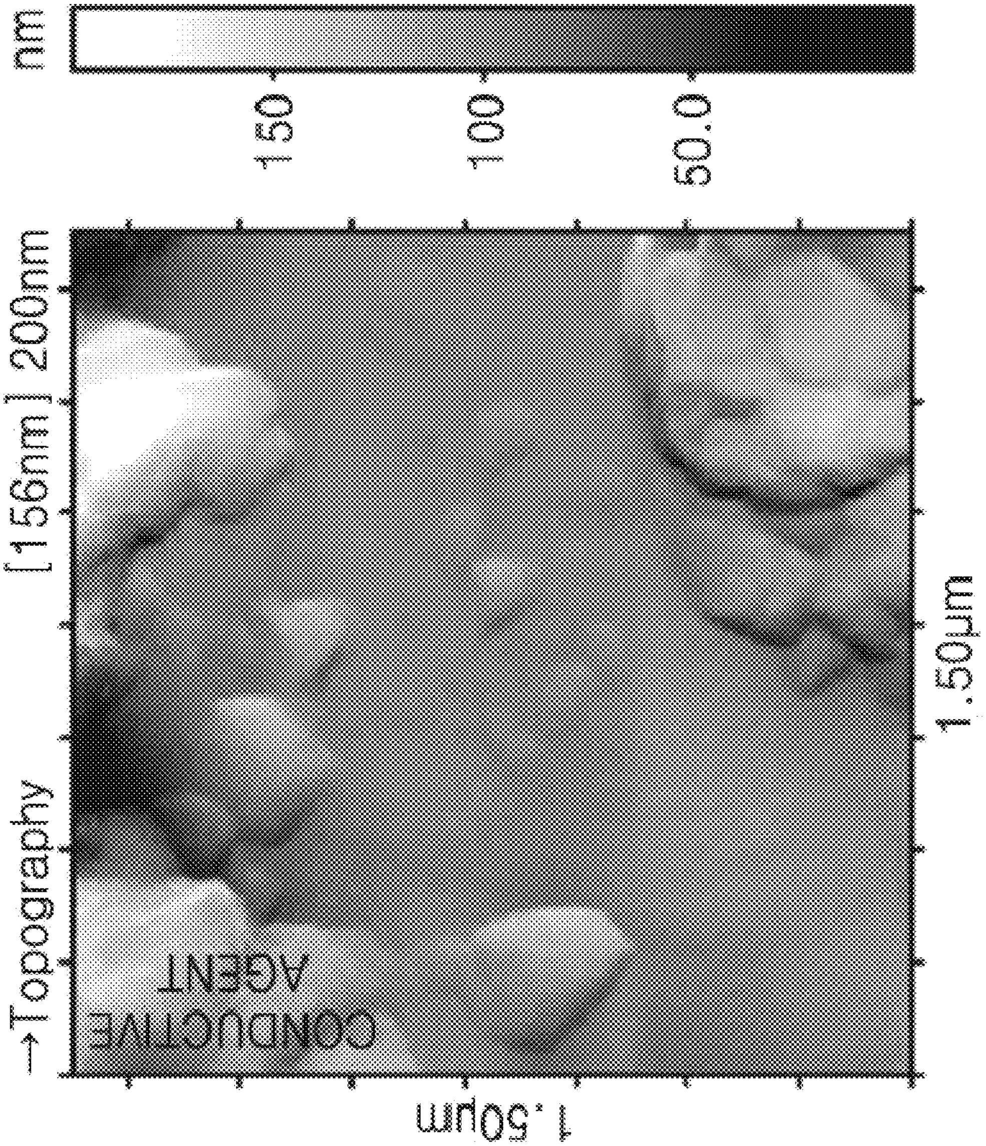
Figure 9D:
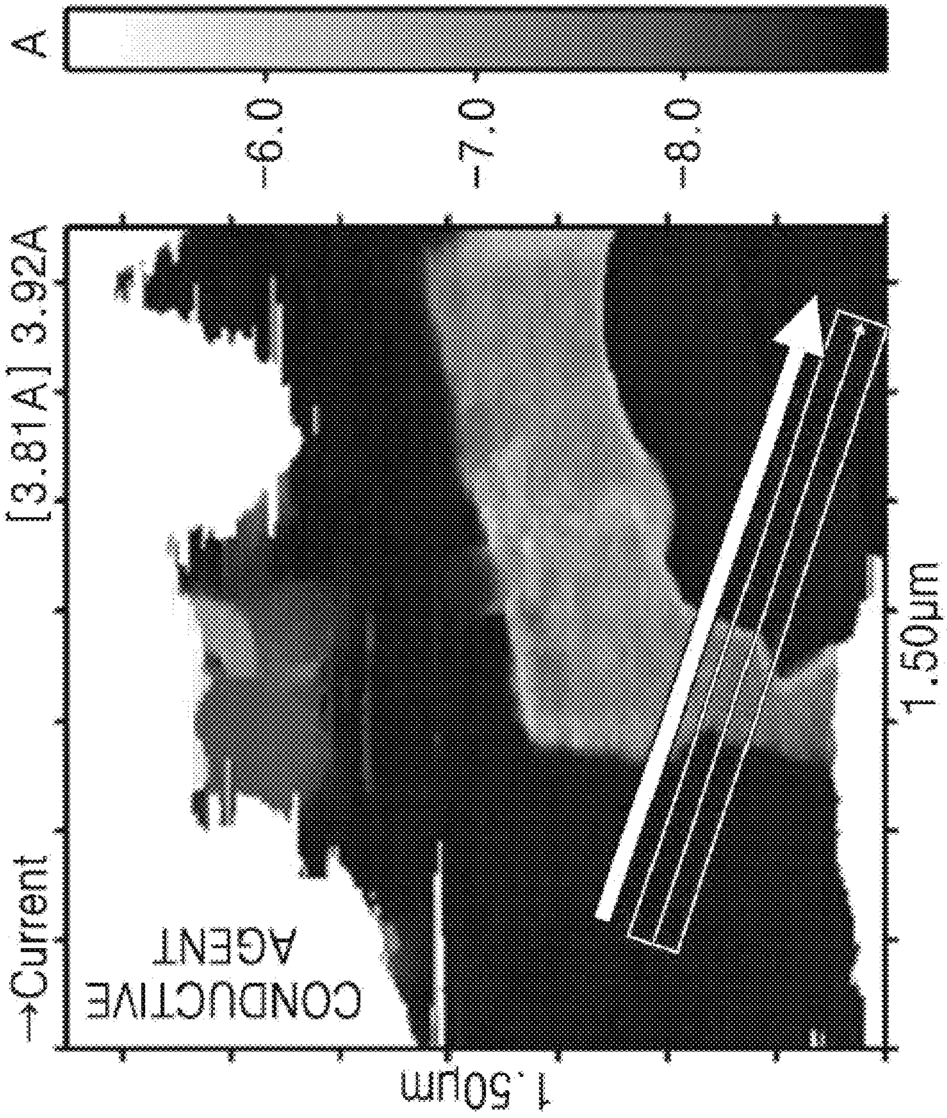
Figure 9E:
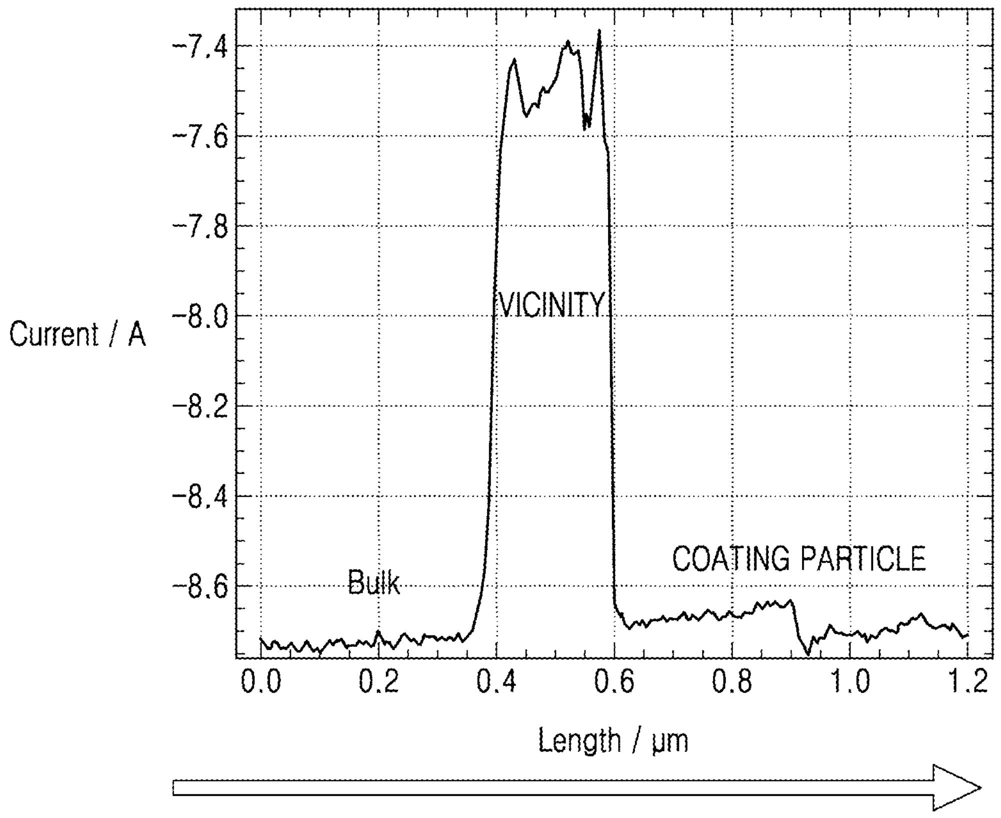

The electrical conductivity of a bulk portion, a particle coating portion, and a surface coating portion of the composite positive active material of Example were evaluated by using AFM. The results thereof are shown in FIGS. 9A to 9E. FIGS. 9A-9B are each a SEM image. FIGS. 9C-9D are each a particle surface current image. FIG. 9E shows a current change according to distance.

As shown in the figures, in the composite positive active material obtained according to Example 1, it was found that the electrical conductivity near the particle was higher than that of other portions, as compared the electrical conductivity of the Zr particle, particle vicinity, and lithium cobalt-based oxide (LCO) bulk surface.

Evaluation Example 10: Energy

Filtering Transmission Electron Microscope & Electron Beam Energy Loss (EF-TEM & EELS)

The composite positive active material of Example 1 was subjected to EF-TEM and EELS analysis.

Figure 10A:
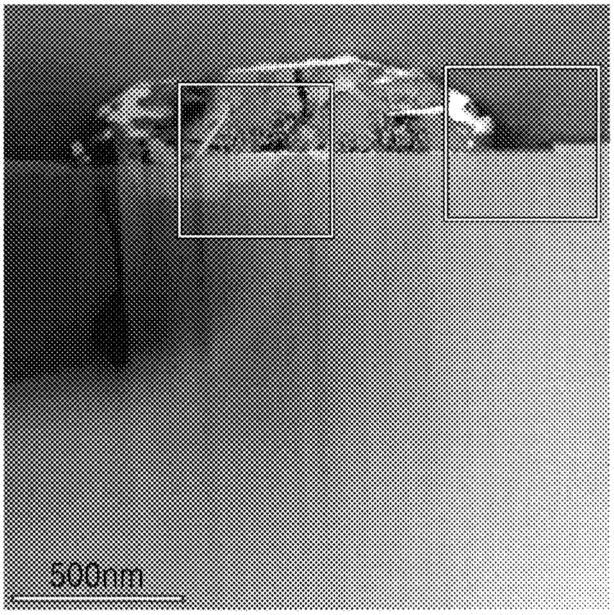
FIGS. 10A to 10E are results of energy filtering transmission electron microscope & electron beam energy loss (EF-TEM & EELS) analysis of the composite positive active material of Example 1.
Figure 10B:
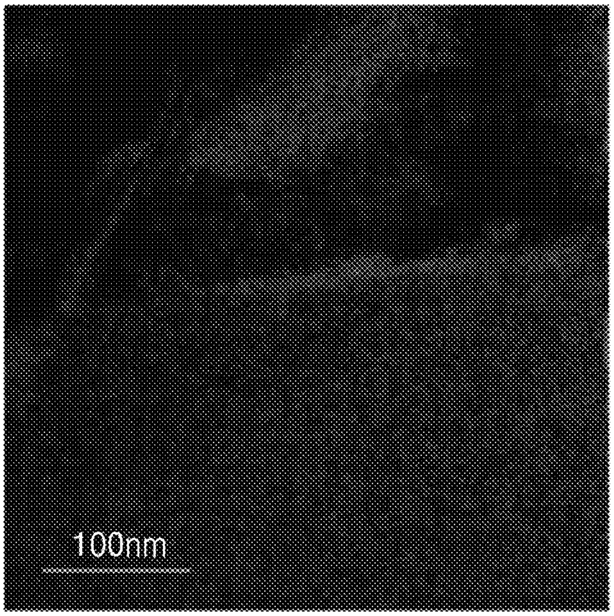
Figure 10C:
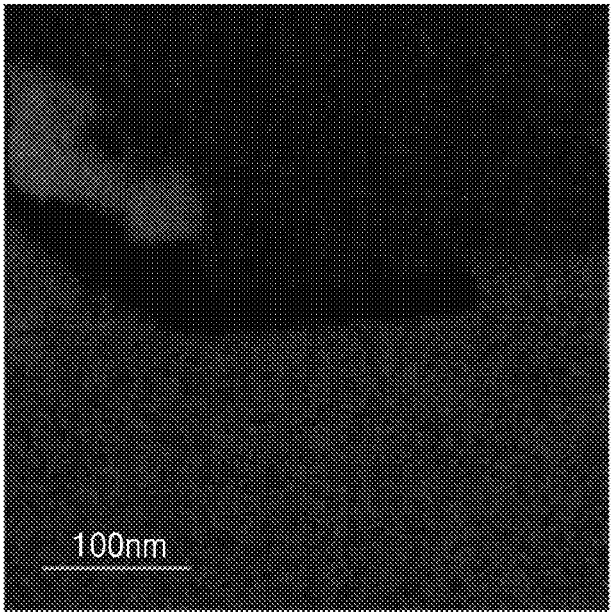
Figure 10D:
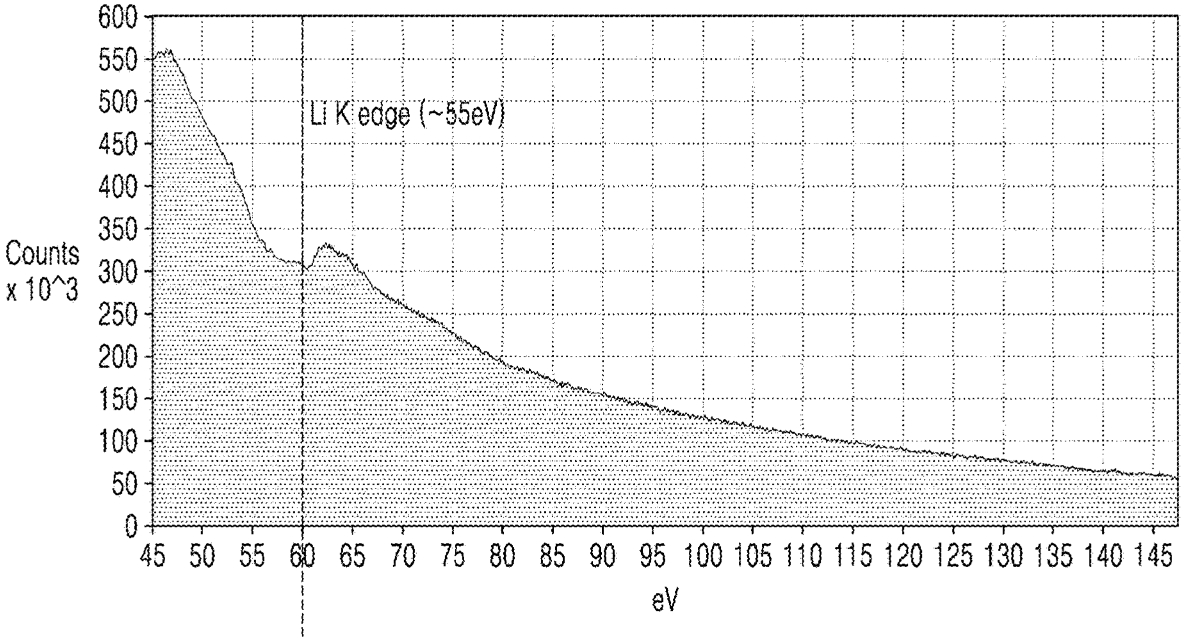
Figure 10E:
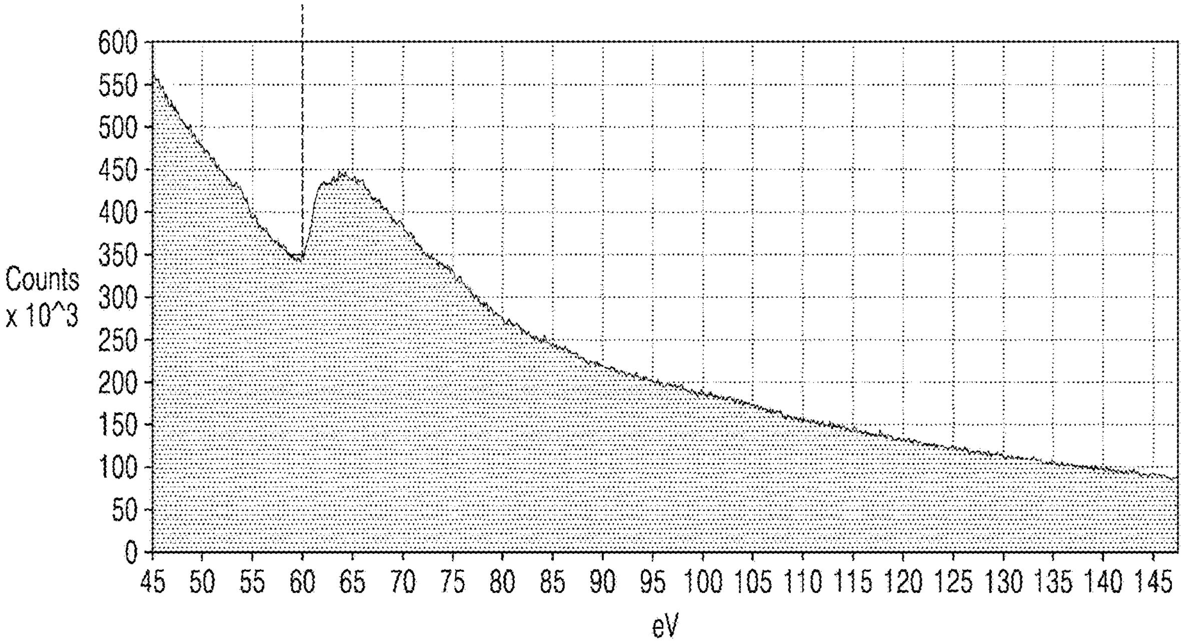

The results thereof are shown in FIGS. 10A to 10E. FIG. 10A shows an EDS MAP measurement portion. FIG. 10B shows an EDS lithium mapping image of the left rectangular portion in FIG. 10A. FIG. 10C shows an EDS lithium mapping image of the right rectangular portion in FIG. 10A. FIGS. 10D and 10E respectively show EELS analysis on the particle coating portion and the LCO.

As shown in FIGS. 10A to 10E, the composite positive active material of Example 1 was found to have lithium uniformly in the particle coating portion and the inner portion.

Evaluation Example 11: High-Resolution Transmission Electron Microscopy (HR-TEM)

Figure 11A:
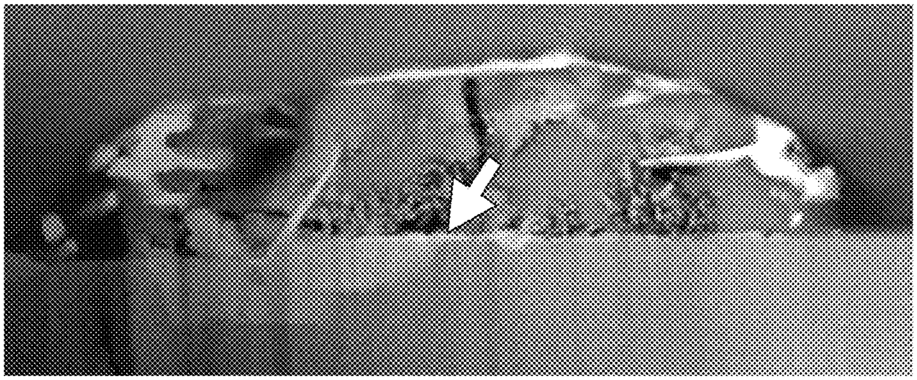
FIGS. 11A to 11D are images showing the results of HR-TEM analysis.
Figure 11B:
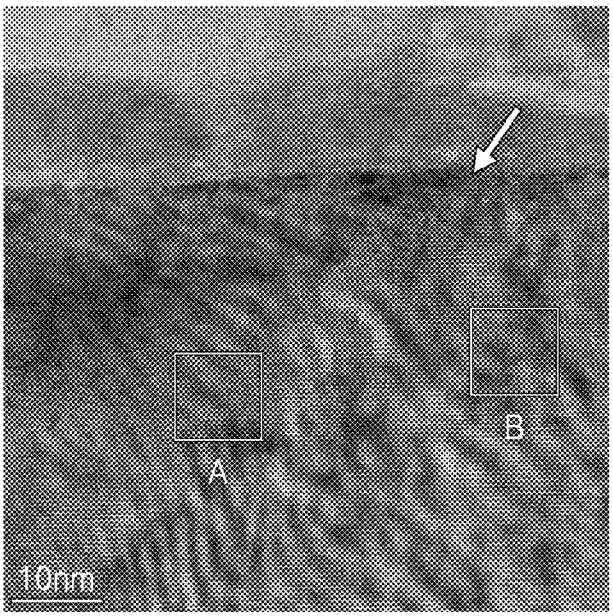
Figure 11C:
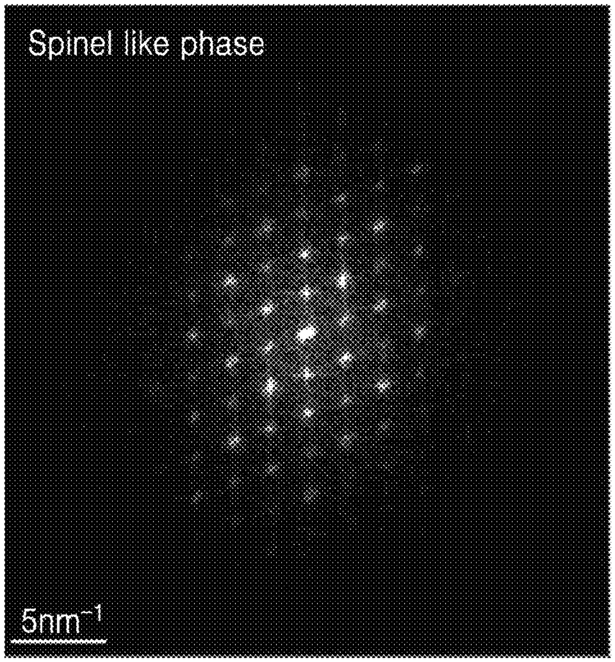
Figure 11D:
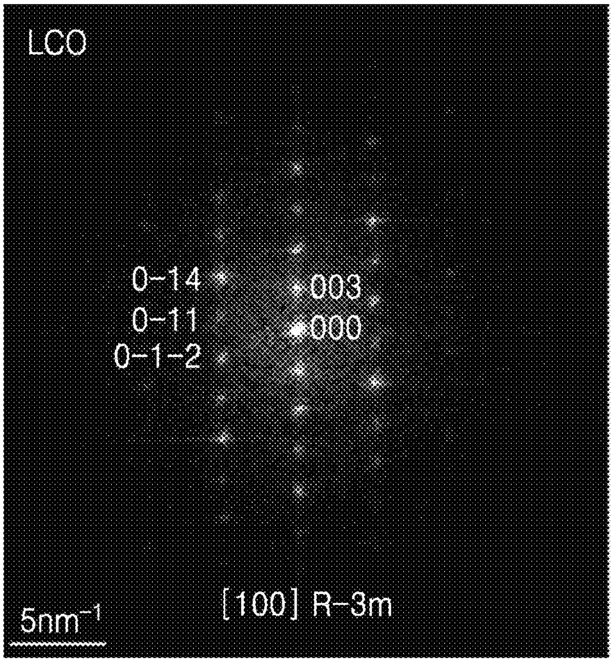

HR-TEM analysis was performed on the composite positive active material of Example 1 to analyze the crystalline structure of the lithium-deficient cobalt oxide phase present in LCO. The HR-TEM analysis results are shown in FIG. 11A to 11D. FIG. 11A shows the analyzed portion. FIG. 11B is an enlarged HR-TEM image of the portion indicated by an arrow in FIG. 11A. FIGS. 11C-11D are respectively TEM images of the crystalline structures of Portions A and B in FIG. 11B.

When observing the bright portion on the surface of the lithium cobalt-based oxide (LCO), for example, the core active material, and the LCO interface, a spinel-like phase having a regular ordering twice the length of the existing d-spacing was observed in the (0-14) and (012) plane directions in the LCO layered structure.

Figure 12A:
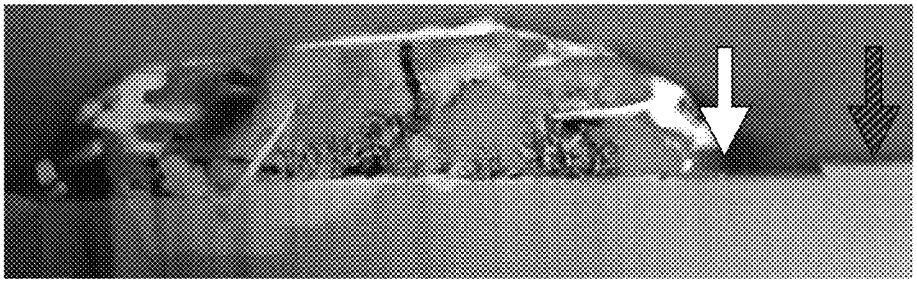
FIGS. 12A to 12C show HR-TEM analysis images of the composite positive active material of Example 1.
Figure 12B:
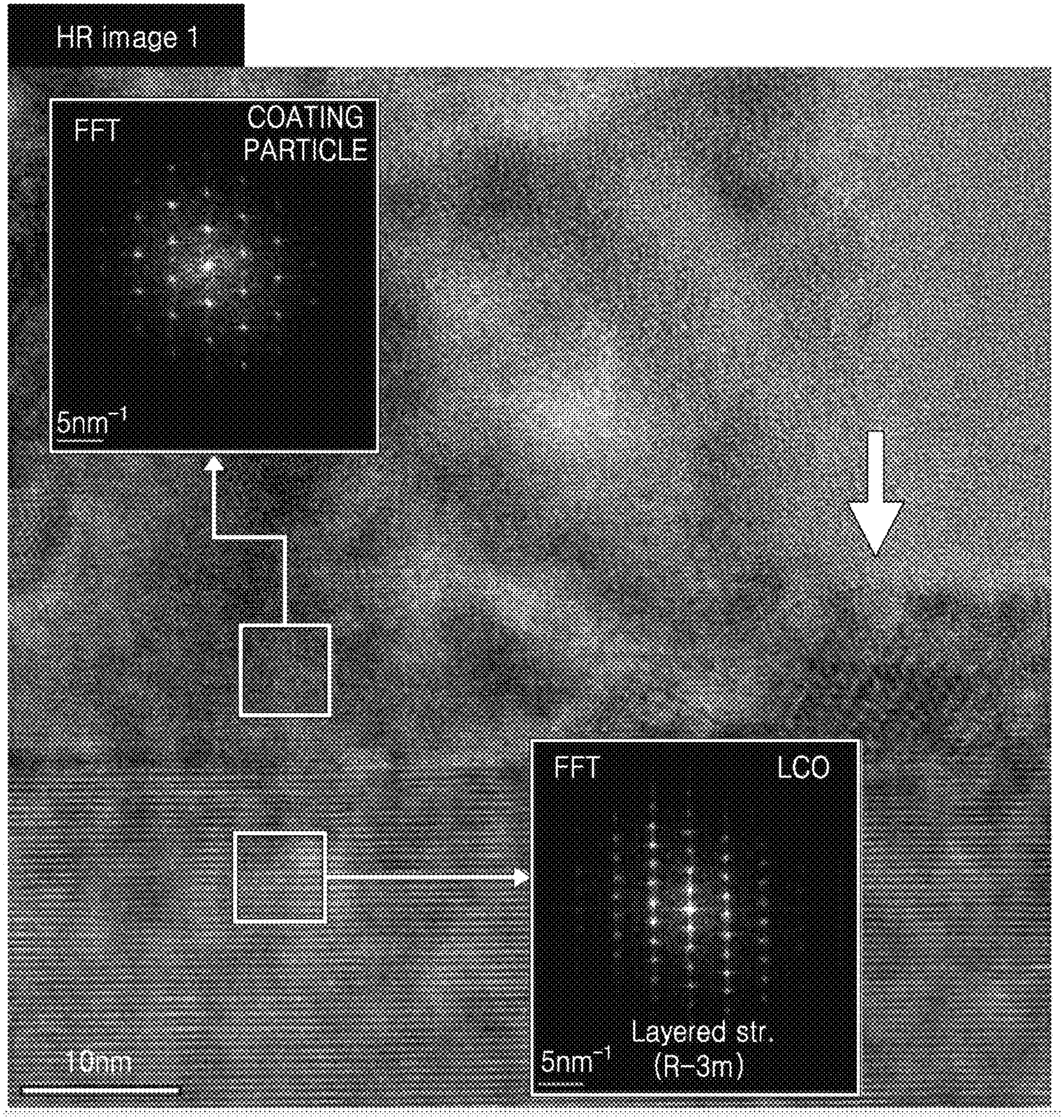
Figure 12C:
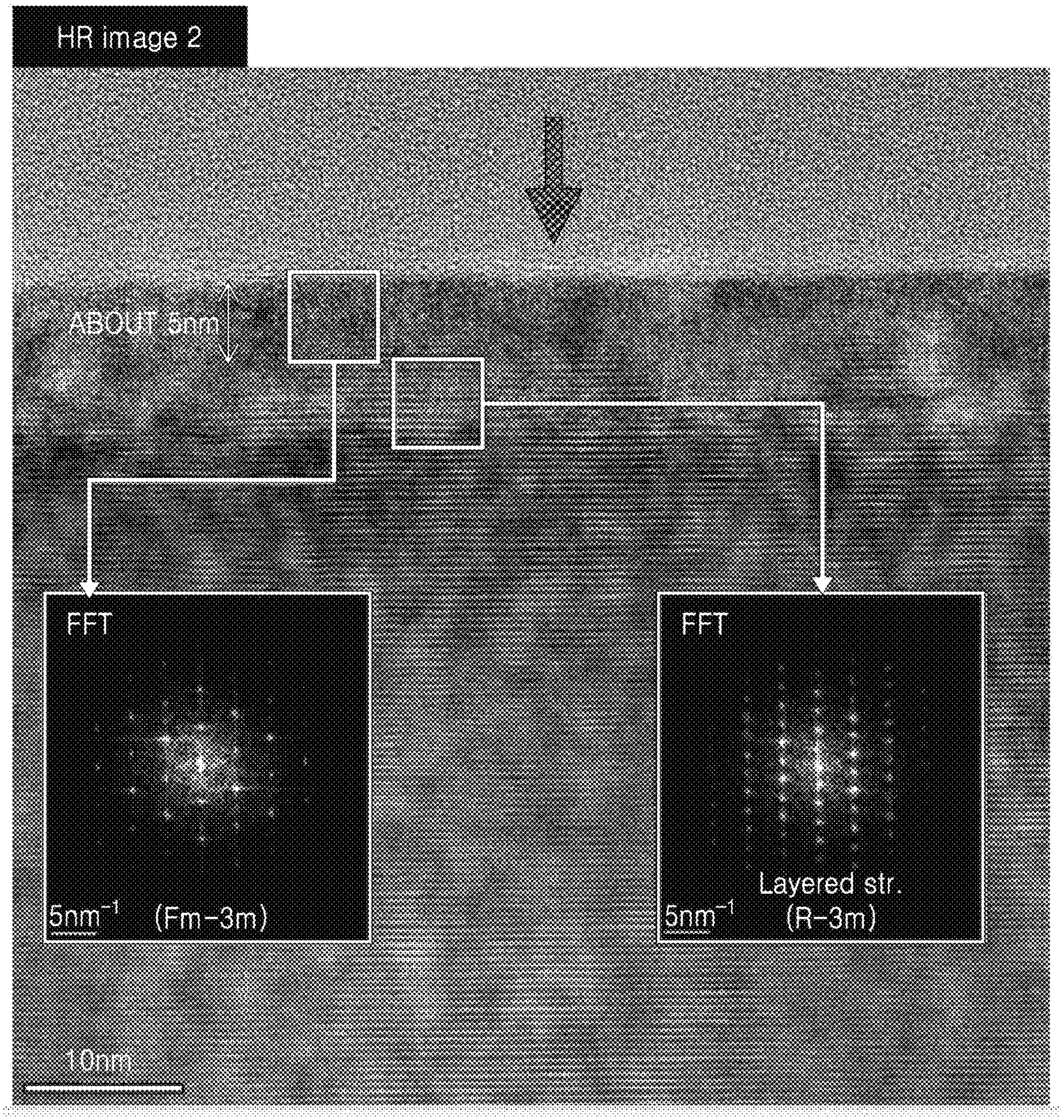

In addition, HR-TEM analysis was performed on the composite positive active material of Example 1 to investigate the crystalline structure of the lithium-deficient cobalt oxide phase present in the LCO. The analysis results are shown in FIGS. 12A to 12C. FIG. 12B is the analysis image of crystalline structure of the portion indicated by a left arrow in FIG. 12A. FIG. 12C is the analysis image of crystalline structure of the portion indicated by a right arrow in FIG. 12A.

As shown in the figures, the coating portion included several crystal grains, but as shown in FIG. 12B, epitaxial growth was observed at the interface with LCO (HR image 1), which was similar to the rock salt (Fm-3m) phase generated on the LCO surface (HR image 2) of the uncoated portion as shown in FIG. 12C.

Evaluation Example 12: TEM-EDS Analysis (II)

The composite positive active material of Example 1 was subjected to TEM-EDS analysis. The analysis results thereof are shown in FIG. 13A.

Figure 13A:
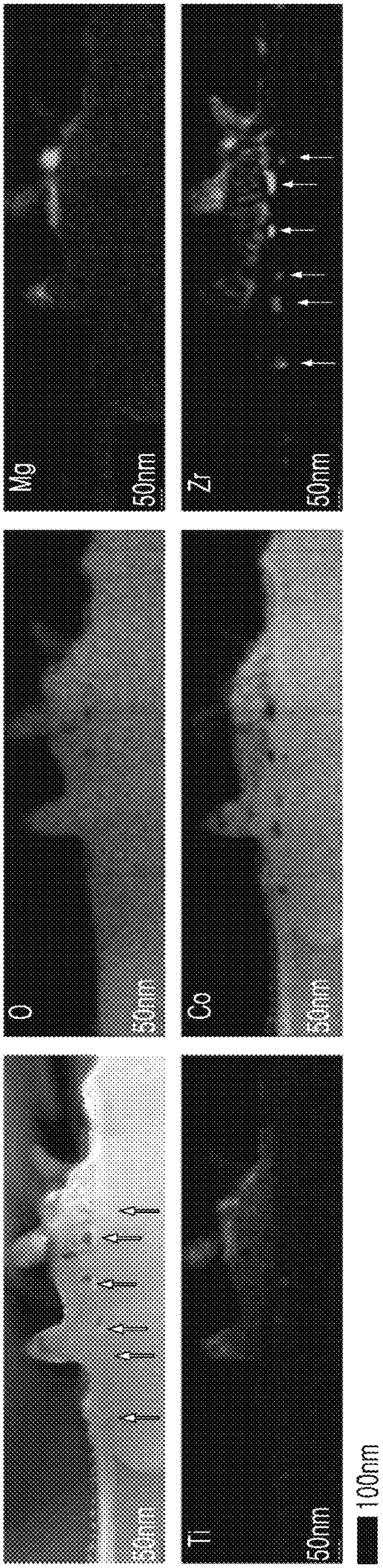
FIG. 13A shows TEM-EDS analysis images of the composite positive active material of Example 1.

As shown in FIG. 13A, Zr-containing portions of several tens of nanometers were observed inside the composite positive active material particle (indicated by an arrow).

Figure 13B:
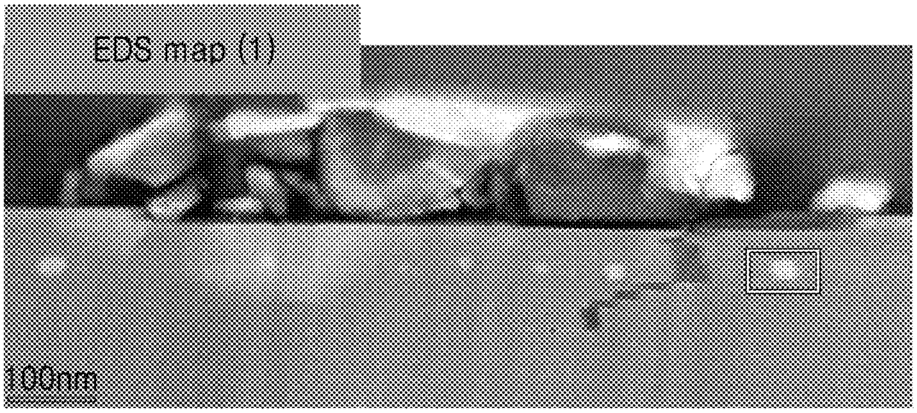
FIGS. 13B-13C are TEM-EDS analysis images of Portions 1 and 2 of the composite positive active material of Example 1, respectively.
Figure 13C:
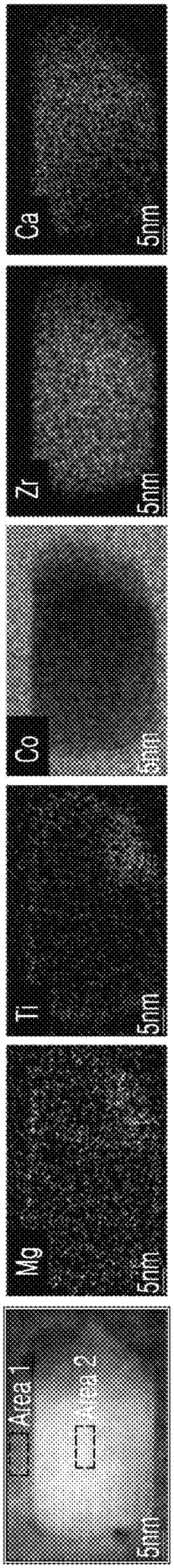

TEM-EDS analysis was performed on Portions 1 and 2 of the composite positive active material of Example 1. The results thereof are shown in FIGS. 13B-13C and Table 2 by a content of each element. FIG. 13C shows the EDS analysis results on the rectangular portion in FIG. 13B.

TABLE 2

| | Atomic % | |
|---|---|---|
| Element | Area 1 (LCO) | Area 2 (Li—Zr—O) |
| O | 59.10 | 65.64 |
| Mg | 0.37 | 0.39 |
| Ca | 0.10 | 2.98 |
| Ti | 0.26 | 0.30 |
| Co | 39.73 | 12.98 |
| Zr | 0.43 | 17.71 |

According to FIGS. 13B-13C and Table 2, as a result of EDS measurement by magnifying the portion of the first lithium zirconium-based oxide that was observed to be several tens of nm in size inside the LCO, it was found that the Zr content was relatively high.

As apparent from the foregoing description, the composite positive active material according to one or more embodiments may have improved electrical conductivity, surface phase transition suppression effects (e.g., surface phase transition may be reduced), and suppressed (e.g., reduced) surface side reactions with an electrolyte. A lithium secondary battery having improved high voltage characteristics may be manufactured by including a positive electrode containing the composite positive active material.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims, and equivalents thereof.

What is claimed is:

1. A composite positive active material for a lithium secondary battery, comprising a lithium cobalt-based oxide, wherein:

a particle coating portion is in an island form on a surface of the lithium cobalt-based oxide, the particle coating portion comprising a first coating layer comprising a lithium titanium-based oxide, a lithium-deficient cobalt oxide phase having a molar ratio of lithium to cobalt of 0.9 or less is comprised in an inner portion of the lithium cobalt-based oxide corresponding to the particle coating portion, and the composite positive active material comprises a first lithium zirconium-based oxide spaced apart from a surface of the lithium cobalt-based oxide toward a center of the lithium cobalt-based oxide, wherein the lithium cobalt-based oxide includes aluminum and magnesium, and a content of aluminum in the lithium cobalt-based oxide is 4,000 ppm or greater, and a content of magnesium in the lithium cobalt-based oxide is 1,000 ppm or greater, wherein the lithium-deficient cobalt oxide phase comprises a compound represented by Formula 5, a compound represented by Formula 5-1, or a compound represented by Formula 5-2, and wherein the particle coating portion further comprises a second coating layer, and the second coating layer is on the first coating layer and comprises a second lithium zirconium-based oxide:

Formula 5

$$Li_{1-\alpha}Mg_aCo_{1-x}M_xO_2$$

wherein, in Formula 5, M is W, Mo, Zr, Ti, Mg, Ta, Al, Fe, V, Cr, Ba, Ca, Nb, or a combination thereof, $0.1\leq\alpha\leq0.5$, $0<a\leq0.05$, and $0\leq x\leq0.05$, Formula 5-1

$$Li_{1-\alpha}Mg_aCo_{2-x}M_xO_4$$

wherein, in Formula 5-1, M is W, Mo, Zr, Ti, Mg, Ta, Al, Fe, V, Cr, Ba, Ca, Nb, or a combination thereof, $0.1\leq\alpha0.5$, $0<a\leq0.05$, and $0\leq x\leq0.05$, Formula 5-2

$$Co_{3-x}M_xO_4$$

wherein, in Formula 5-2, M is W, Mo, Zr, Ti, Mg, Ta, Al, Fe, V, Cr, Ba, Ca, Nb, or a combination thereof, and $0\leq x\leq0.05$.

2. The composite positive active material of claim 1, wherein a content ratio of magnesium to cobalt, based on a number of moles of magnesium to a number of moles of cobalt, comprised in the lithium-deficient cobalt oxide phase is greater than a content ratio of magnesium to cobalt, based on a number of moles of magnesium to a number of moles of cobalt, comprised in the lithium cobalt-based oxide.

3. The composite positive active material of claim 1, wherein a surface coating portion is on an inner portion of another surface of the lithium cobalt-based oxide, and the surface coating portion comprises a third coating layer having a spinel crystalline structure.

4. The composite positive active material of claim 1, wherein a content of the second lithium zirconium-based oxide is in a range of about 0.05 parts to about 0.2 parts by weight, based on 100 parts by weight of the lithium cobalt-based oxide.

5. The composite positive active material of claim 1, wherein the second lithium zirconium-based oxide comprises a compound represented by Formula 2:

Formula 2

$$Li_{2+a}Zr_{(1-x-z)}Co_zM2_xO_3$$

wherein, in Formula 2, M2 is at least one element selected from the group consisting of boron (B), magnesium (Mg), calcium (Ca), strontium (Sr), barium (Ba), titanium (Ti), vanadium (V), chromium (Cr), iron (Fe), copper (Cu), and aluminum (Al), and $-0.1\leq a\leq0.1$, $0\leq x<1$, and $0\leq z\leq0.1$.

6. The composite positive active material of claim 1, wherein the inner portion is in contact with the particle coating portion, and the first lithium zirconium-based oxide is present in a particle state at a position spaced apart from the inner portion.

7. The composite positive active material of claim 1, wherein the first lithium zirconium-based oxide is present within 150 nm from a surface of the lithium cobalt-based oxide.

8. The composite positive active material of claim 1, wherein the first lithium zirconium-based oxide has a layered crystalline structure and is represented by Formula 6:

Formula 6

$$Li_{2+a}Zr_{(1-x-z)}Co_zM1_xO_3$$

wherein, in Formula 6, M1 is at least one element selected from the group consisting of boron (B), magnesium (Mg), calcium (Ca), strontium (Sr), barium (Ba), titanium (Ti), vanadium (V), chromium (Cr), iron (Fe), copper (Cu), and aluminum (Al), and $$-0.1\leq a\leq0.1,\ 0\leq x<1,\ \text{and}\ 0\leq z\leq0.5.$$

9. The composite positive active material of claim 1, wherein the lithium-deficient cobalt oxide phase has a spinel crystalline structure, the lithium-deficient cobalt oxide phase is present in a portion within 100 nm from an outermost surface of the lithium cobalt-based oxide.

10. The composite positive active material of claim 1, wherein the lithium titanium-based oxide is a compound represented by Formula 1:

Formula 1

$$Li_{2+a}Ti_{(1-x-y)}Co_xMg_yO_3$$

wherein, in Formula 1, $-0.1 \leq a \leq 0.1$, $0 < x \leq 0.5$, and $0 < y \leq 0.1$.

11. The composite positive active material of claim 3, wherein the surface coating portion comprises a lithium cobalt-based oxide A.

12. The composite positive active material of claim 11, wherein a content of the lithium cobalt-based oxide A is in a range of about 0.01 parts to about 1 part by weight, based on 100 parts by weight of the lithium cobalt-based oxide.

13. The composite positive active material of claim 1, wherein the lithium cobalt-based oxide is a compound represented by Formula 3:

Formula 3

$$Li_{a-b}Mg_bCo_{(1-x-y-b)}Al_xM3_yO_2$$

wherein, in Formula 3, $0.9 \leq a \leq 1.1$, $0 \leq b \leq 0.02$, $0 \leq x \leq 0.04$, and $0 \leq y \leq 0.01$, and M3 is one selected from Ni, K, Na, Ca, Mg, Si, Fe, Cu, Zn, Ti, Sn, V, Ge, Ga, B, P, Se, Bi, As, Zr, Mn, Cr, Ge, Sr, Sc, Y, and a combination thereof.

14. The composite positive active material of claim 1, wherein a content of the lithium titanium-based oxide in the particle coating portion is in a range of about 0.05 parts to about 1.0 parts by weight, based on 100 parts by weight of the lithium cobalt-based oxide.

15. The composite positive active material of claim 1, wherein the lithium cobalt-based oxide is small particles, large particles, or a mixture of small particles and large particles.

16. The composite positive active material of claim 15, wherein a size of the large particles is in a range of about 10 μm to about 20 μm, and a size of the small particles is in a range of about 3 μm to about 6 μm.

17. The composite positive active material of claim 15, wherein a mixing weight ratio of large particles to small particles in the mixture of small particles and large particles is in a range of about 7:3 to about 9:1.

18. A method of preparing the composite positive active material for a lithium secondary battery of claim 1, the method comprising: mixing a lithium cobalt-based oxide, a titanium precursor, and cobalt hydroxide together to obtain a first precursor mixture and heat-treating the first precursor mixture; and mixing a product of the primary heat treatment together with a zirconium precursor to obtain a second precursor mixture and heat-treating the second precursor mixture.

19. The method of claim 18, wherein a content of the zirconium precursor is in a range of about 0.6 parts to about 1.4 parts by weight, based on 100 parts by weight of the lithium cobalt-based oxide.

20. The method of claim 18, wherein a content of the cobalt hydroxide is in a range of about 3.5 parts to about 7 parts by weight, based on 100 parts by weight of the lithium cobalt-based oxide.

21. The method of claim 18, wherein the zirconium precursor is zirconium oxide, and the titanium precursor is at least one selected from titanium hydroxide, titanium chloride, titanium sulfate, and titanium oxide.

22. The method of claim 18, wherein the heat-treating of the first precursor mixture is performed at a temperature in a range of about 850° C. to about 980° C.

23. The method of claim 18, wherein the heat-treating of the second precursor mixture is performed at a temperature in a range of about 950° C. to about 1,000° C.

24. A lithium secondary battery comprising: a positive electrode comprising the composite positive active material according to claim 1; a negative electrode; and an electrolyte between the positive electrode and the negative electrode.

* * * * *